US008335304B2

(12) United States Patent
Petite

(10) Patent No.: US 8,335,304 B2
(45) Date of Patent: *Dec. 18, 2012

(54) MULTI-FUNCTION GENERAL PURPOSE TRANSCEIVERS AND DEVICES

(75) Inventor: Thomas D. Petite, Atlanta, GA (US)

(73) Assignee: SIPCO, LLC, Atlanta, GA (US)

( * ) Notice: Subject to any disclaimer, the term of this patent is extended or adjusted under 35 U.S.C. 154(b) by 876 days.

This patent is subject to a terminal disclaimer.

(21) Appl. No.: 12/169,536

(22) Filed: Jul. 8, 2008

(65) Prior Publication Data

US 2009/0068947 A1    Mar. 12, 2009

Related U.S. Application Data

(63) Continuation of application No. 09/756,386, filed on Jan. 8, 2001, now Pat. No. 7,397,907, which is a continuation of application No. 09/102,399, filed on Jun. 22, 1998, now Pat. No. 6,233,327, which is a continuation-in-part of application No. 08/825,576, filed on Mar. 31, 1997, now Pat. No. 7,137,550, and a continuation-in-part of application No. 08/895,720, filed on Jul. 17, 1997, now Pat. No. 5,926,531, and a continuation-in-part of application No. 08/910,980, filed on Aug. 7, 1997, now abandoned.

(60) Provisional application No. 60/040,316, filed on Feb. 14, 1997, provisional application No. 60/059,643, filed on Sep. 20, 1997.

(51) Int. Cl.
*H04M 17/00* (2006.01)

(52) U.S. Cl. ............ 379/155; 379/39; 379/40; 379/143; 455/91

(58) Field of Classification Search ............... 379/32.01, 379/39, 40, 43, 44, 45, 47, 49, 51, 52, 56.3, 379/143, 144.01, 144.05, 155; 455/91, 95, 455/96, 102

See application file for complete search history.

(56) References Cited

U.S. PATENT DOCUMENTS

| | | | |
|---|---|---|---|
| 3,768,014 | A | 10/1973 | Smith et al. |
| 3,769,965 | A | 11/1973 | Raddi et al. |
| 3,885,552 | A | 5/1975 | Kennedy |
| 4,322,842 | A | 3/1982 | Martinez |

(Continued)

FOREIGN PATENT DOCUMENTS

CA            945277            4/1974

(Continued)

OTHER PUBLICATIONS

Babak Daneshrad, et al.; 1997 Project Summary "Mobile Versatile Radios (MoVeR);" University of California, Los Angeles; pp. 1-4.

(Continued)

*Primary Examiner* — Binh Tieu

(74) *Attorney, Agent, or Firm* — Dustin B. Weeks, Esq.; Troutman Sanders LLP

(57) ABSTRACT

The present invention is generally directed to a system and associated method for communicating information. In some embodiments, the invention is directed to a general purpose transceiver having a receiver for receiving an information signal and a transmitter configured to transmit an outgoing signal to a central station. A portion of the information signal can include an instruction code, which may be decoded and acted upon accordingly. Other embodiments and features are also claimed and described.

17 Claims, 10 Drawing Sheets

U.S. PATENT DOCUMENTS

| | | | |
|---|---|---|---|
| 4,395,780 A * | 7/1983 | Gohm et al. .................... 398/67 |
| 4,446,458 A | 5/1984 | Cook | |
| 4,611,198 A | 9/1986 | Levinson et al. | |
| 4,692,761 A | 9/1987 | Robinton | |
| 5,251,205 A | 10/1993 | Callon et al. | |
| 5,319,698 A | 6/1994 | Gilidewell et al. | |
| 5,321,618 A | 6/1994 | Gessman | |
| 5,343,493 A * | 8/1994 | Karimullah .................... 375/130 |
| 5,383,134 A | 1/1995 | Wrzesinski | |
| 5,388,101 A * | 2/1995 | Dinkins ......................... 725/62 |
| 5,390,206 A | 2/1995 | Rein | |
| 5,438,329 A | 8/1995 | Gastouniotis et al. | |
| 5,440,545 A | 8/1995 | Buchholz et al. | |
| 5,445,347 A | 8/1995 | Ng | |
| 5,448,230 A | 9/1995 | Schanker et al. | |
| 5,502,726 A | 3/1996 | Fischer | |
| 5,515,419 A | 5/1996 | Sheffer | |
| 5,521,363 A * | 5/1996 | Tannenbaum ................. 235/379 |
| 5,553,094 A | 9/1996 | Johnson | |
| 5,578,808 A * | 11/1996 | Taylor ........................... 235/380 |
| 5,633,872 A * | 5/1997 | Dinkins ......................... 370/312 |
| 5,640,002 A | 6/1997 | Ruppert et al. | |
| 5,654,690 A * | 8/1997 | Ishikawa et al. .............. 340/506 |
| 5,655,219 A | 8/1997 | Jusa et al. | |
| 5,673,252 A | 9/1997 | Johnson et al. | |
| 5,673,259 A | 9/1997 | Quick, Jr. | |
| 5,702,059 A | 12/1997 | Chu et al. | |
| 5,714,931 A * | 2/1998 | Petite et al. ................. 340/539.17 |
| 5,719,564 A | 2/1998 | Sears | |
| 5,722,076 A * | 2/1998 | Sakabe et al. ................. 455/450 |
| 5,726,984 A | 3/1998 | Kubler et al. | |
| 5,844,808 A * | 12/1998 | Konsmo et al. ............... 700/244 |
| 5,854,793 A * | 12/1998 | Dinkins ......................... 370/503 |
| 5,867,688 A | 2/1999 | Simmon et al. | |
| 5,874,903 A | 2/1999 | Shuey et al. | |
| 5,883,886 A | 3/1999 | Eaton et al. | |
| 5,884,271 A | 3/1999 | Pitroda | |
| 5,892,758 A | 4/1999 | Argyroudis | |
| 5,907,491 A | 5/1999 | Canada | |
| 5,914,656 A | 6/1999 | Ojala et al. | |
| 5,917,629 A | 6/1999 | Hortensius et al. | |
| 5,923,269 A | 7/1999 | Shuey et al. | |
| 5,963,650 A | 10/1999 | Simionescu | |
| 5,987,421 A | 11/1999 | Chuang | |
| 6,026,095 A | 2/2000 | Sherer et al. | |
| 6,044,062 A | 3/2000 | Brownrigg et al. | |
| 6,060,994 A | 5/2000 | Chen | |
| 6,064,318 A | 5/2000 | Kirchner, III et al. | |
| 6,067,030 A * | 5/2000 | Burnett et al. ............ 340/870.05 |
| 6,073,169 A | 6/2000 | Shuey | |
| 6,078,251 A | 6/2000 | Landt et al. | |
| 6,108,614 A | 8/2000 | Lincoln et al. | |
| 6,115,649 A * | 9/2000 | Sakata ........................... 700/241 |
| 6,124,806 A | 9/2000 | Cunningham et al. | |
| 6,141,347 A | 10/2000 | Shaughnesy et al. | |
| 6,157,464 A | 12/2000 | Bloomfield et al. | |
| 6,174,205 B1 | 1/2001 | Madsen et al. | |
| 6,175,922 B1 | 1/2001 | Wang | |
| 6,178,173 B1 * | 1/2001 | Mundwiler et al. ........... 370/410 |
| 6,181,284 B1 | 1/2001 | Madsen et al. | |
| 6,185,307 B1 * | 2/2001 | Johnson, Jr. .................. 380/270 |
| 6,188,354 B1 | 2/2001 | Soliman et al. | |
| 6,218,958 B1 | 4/2001 | Eichstaedt | |
| 6,246,677 B1 | 6/2001 | Nap | |
| 6,275,707 B1 | 8/2001 | Reed et al. | |
| 6,288,641 B1 | 9/2001 | Casais | |
| 6,301,514 B1 | 10/2001 | Canada et al. | |
| 6,366,217 B1 | 4/2002 | Cunningham | |
| 6,366,622 B1 | 4/2002 | Brown et al. | |
| 6,384,722 B1 | 5/2002 | Williams | |
| 6,389,477 B1 | 5/2002 | Simmon et al. | |
| 6,396,839 B1 | 5/2002 | Ardalan | |
| 6,405,018 B1 | 6/2002 | Reudink et al. | |
| 6,457,038 B1 | 9/2002 | Defosse | |
| 6,532,077 B1 | 3/2003 | Arakawa | |
| 6,542,076 B1 | 4/2003 | Joao | |
| 6,618,709 B1 | 9/2003 | Sneeringer | |
| 6,654,357 B1 | 11/2003 | Wiedeman | |
| 6,671,819 B1 | 12/2003 | Passman et al. | |
| 6,735,630 B1 | 5/2004 | Gelvin et al. | |
| 6,751,196 B1 | 6/2004 | Hulyalkar et al. | |
| 6,816,088 B1 | 11/2004 | Knoska et al. | |
| 6,888,876 B1 | 5/2005 | Mason, Jr. et al. | |
| 7,027,416 B1 | 4/2006 | Kriz | |
| 7,103,511 B2 | 9/2006 | Petite | |
| 7,397,907 B2 * | 7/2008 | Petite ............................. 379/155 |
| 7,424,527 B2 | 9/2008 | Petite et al. | |
| 2002/0027504 A1 | 3/2002 | Petite et al. | |
| 2002/0032560 A1 | 3/2002 | Simmon et al. | |
| 2002/0035637 A1 | 3/2002 | Simmon et al. | |
| 2002/0036619 A1 | 3/2002 | Simmon et al. | |
| 2002/0038377 A1 | 3/2002 | Simmon et al. | |
| 2002/0038378 A1 | 3/2002 | Simmon et al. | |
| 2002/0040406 A1 | 4/2002 | Simmon et al. | |
| 2002/0097273 A1 | 7/2002 | Simmon et al. | |
| 2002/0184384 A1 | 12/2002 | Simmon et al. | |
| 2003/0023146 A1 | 1/2003 | Shusterman | |
| 2003/0035438 A1 | 2/2003 | Larrson | |
| 2003/0073406 A1 | 4/2003 | Benjamin et al. | |
| 2005/0017068 A1 * | 1/2005 | Zalewski et al. .............. 235/380 |
| 2005/0195768 A1 | 9/2005 | Petite et al. | |
| 2005/0195775 A1 | 9/2005 | Petite | |
| 2005/0201397 A1 | 9/2005 | Petite | |
| 2008/0186898 A1 | 8/2008 | Petite | |
| 2009/0006617 A1 | 1/2009 | Petite | |
| 2009/0068947 A1 | 3/2009 | Petite | |

FOREIGN PATENT DOCUMENTS

| | | |
|---|---|---|
| CA | 2324563 | 9/1999 |
| DE | 2205336 | 8/1973 |
| DE | 4401443 | 8/1994 |
| EP | 0483547 A1 | 5/1992 |
| EP | 0578041 B1 | 1/1994 |
| EP | 0663746 B1 | 7/1995 |
| EP | 0718954 A1 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 0825577 A1 | 2/1998 |
| EP | 0550517 | 12/1998 |
| EP | 0999717 A2 | 5/2000 |
| EP | 1096454 A2 | 5/2001 |
| FR | 2126301 | 10/1972 |
| FR | 2624749 | 6/1989 |
| FR | 2817110 A1 | 5/2002 |
| GB | 1384573 | 2/1975 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 1255100 A | 10/1989 |
| JP | 11353573 A | 12/1999 |
| JP | 2000113590 A | 4/2000 |
| JP | 2001063425 A | 3/2001 |
| JP | 2001088401 A | 4/2001 |
| JP | 2001309069 A | 11/2001 |
| JP | 2001319284 A | 11/2001 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| SE | 377048 | 6/1975 |
| WO | WO 90/13197 | 11/1990 |
| WO | WO 95/12942 | 5/1995 |
| WO | WO 95/24177 | 9/1995 |
| WO | WO 95/34177 | 12/1995 |

| | | |
|---|---|---|
| WO | WO 96/10307 | 4/1996 |
| WO | WO 97/00708 | 1/1997 |
| WO | WO 98/00056 | 1/1998 |
| WO | WO98/10393 A1 | 3/1998 |
| WO | WO 98/37528 | 8/1998 |
| WO | WO 98/45717 | 10/1998 |
| WO | WO 99/13426 | 3/1999 |
| WO | WO 99/45510 | 9/1999 |
| WO | WO 99/48065 | 9/1999 |
| WO | WO 00/23956 | 4/2000 |
| WO | WO00/36812 A1 | 6/2000 |
| WO | WO 00/55825 | 9/2000 |
| WO | WO 00/58745 | 10/2000 |
| WO | WO 01/15114 | 3/2001 |
| WO | WO 01/24109 | 4/2001 |
| WO | WO 01/35190 | 5/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 2004/002014 | 12/2003 |

OTHER PUBLICATIONS

Rajeev Jain, et al.; 1997 Project Summary "Held Untethered Nodes;" University of California, Los Angeles; pp. 1-5.
Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley.edu/talks/retreat.6.96/Overview.pdf.
J.J. Garcia-Luna-Aceves, et al.; "Wireless Internet Gateways (Wings);" IEEE, 1997; pp. 1271-1276.
Randy H. Katz, et al.; "The Bay Area Research Wireless Access Network (BARWAN);" Electrical Engineering and Computer Science Department, University of California, Berkeley, CA; IEEE, 1996; pp. 15-20, including slide show presentation at http://daedalus.cs.berkeley.edu/talks/retreat.6.97/BARWAN.S97.ppt.
USPTO's Decision dated Nov. 28, 2008 Denying Ex Parte Reexamination of USPN 7,103,511 in Reexamination Control No. 90/010,315.
USPTO's Decision dated Jun. 22, 2009 Granting Ex Parte Reexamination of USPN 7,103,511 in Reexamination Control No. 90/010,509.
USPTO's Decision dated Jun. 22, 2009 Granting Ex Parte Reexamination of USPN 7,103,511 in Reexamination Control No. 90/010,505.
USPTO's Decision dated Jun. 22, 2009 Granting Ex Parte Reexamination of USPN 7,103,511 in Reexamination Control No. 90/010,507.
USPTO's Decision dated Jun. 22, 2009 Granting Ex Parte Reexamination of USPN 7,103,511 in Reexamination Control No. 90/010,508.
USPTO's Decision dated Jul. 21, 2009 Granting Ex Parte Reexamination of USPN 6,891,838 in Reexamination Control No. 90/010,512.
USPTO's Decision dated Jul. 21, 2009 Granting Ex Parte Reexamination of USPN 6,891,838 in Reexamination Control No. 90/010,510.
USPTO's Decision dated Jul. 21, 2009 Granting Ex Parte Reexamination of USPN 6,891,838 in Reexamination Control No. 90/010,511.
USPTO's Decision dated Nov. 13, 2009 Granting Ex Parte Reexamination of USPN 6,891,838 in Reexamination Control No. 90/010,301.
David B. Johnson and David A. Maltz, Dynamic Source Routing in Ad Hoc Wireless Networks; Computer Science Department, Carnegie Mellon University; A Chapter in Mobile Computing; Feb. 29, 1996; pp. 1-18.
David A. Maltz et al.; "Experiences Designing and Building a Multi-Hop Wireless Ad Hoc Network Testbed;" School of Computer Science, Carnegie Mellon University; Mar. 5, 1999; pp. 1-20.
"Part 11: Wireless LAN Medium Access Control (MAC) and Physical Layer (PHY) Specifications" IEEE Std 802.11-1997; published Jun. 26, 1997 by the IEE; pp. 1-459.
John Jubin and Janet D. Tornow; "The DARPA Packet Radio Network Protocols;" Proceedings of the IEEE; vol. 75, No. 1, Jan. 1987; pp. 64-79.
Chane Lee Fullmer; "Collision Avoidance Techniques for Packet-Radio Networks" thesis; University of California at Santa Cruz, CA; Jun. 1998; pp. 1-172.
U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Ofice Action dated Jul. 13, 2010.
U.S. Appl. No. 11/125,009 Non-Final Office Action dated Dec. 9, 2010.
U.S. Appl. No. 11/125,009 Non-Final Office Action dated Mar. 1, 2010.
U.S. Appl. No. 11/125,009 Non-Final Office Action dated Apr. 6, 2009.
U.S. Appl. No. 11/125,009 Non-Final Office Action dated Oct. 1, 2008.
U.S. Appl. No. 11/125,009 Notice of Allowance dated Sep. 21, 2009.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
"Wayport's Value Proposition: To provide the industry's best high-speed Internet and business center experience for the airport passenger to stay productive," http://www.wayport.net/airportsoverview (visited Jul. 29, 2003) (2 pages).
"Welcome to UtiliNet: A Wireless Data Communications Solution from Metricom, Inc.," Author: unknown, available at http://web.archive.org/web/199806028045812/www.metricom.com/industrial/utilinet.html on May 10, 2010, pp. 1-10.
"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.
"Wireless Access List—Atlanta Hartsfield International Airport," http://www.ezgoal.com/hotsports/wireless/f.asp?fid=63643 (visited Jul. 29, 2003) (1 page).
"Wireless Accessories, catalog pages," Home Automation, Inc (archived web page), 1997.
"ESTeem Model 96C," ESTeem Radios (describing a system that was for sale at least as early as 1994).
"Site Survey Report," ESTeem Radios, Sep. 24, 1993.
"Technical Bulletin—Johnson Controls," ESTeem Radios, Jan. 29, 1998.

Abbott et al., "Wireless Product Applications for Utilities," Electric Power Research Institute, Feb. 1996, pp. 1-137.

About AES Corporation, AES IntelliNet, Author: unknown, available at http://web.archive.org/web/19990127093116/www/aes-intellinet.com/ae, on Mar. 5, 2009, pp. 1-2.

Ademco Group, 7720NX Network Extender,Ademco Group, Author: unknown, 1998; pp. 1-2.

Ademco Group, 4110DL Security System, Installation Instructions, Oct. 1996, Ademco Group, Author: unknown, pp. 1-15.

Ademco Group, 4110XM Security System, Installation Instructions, Jul. 1996, Ademco Group, Author: unknown, pp. 1-20.

Ademco Group, 4120EC Security System, Installation Instructions, Nov. 1990, Ademco Group, Author: unknown, pp. 1-17.

Ademco Group, 4120XM Security System, Installation Instructions, Oct. 1993, Ademco Group, Author: Unknown, pp. 1-80.

Ademco Group, 4140XMPT2 Partitioned Security System with Scheduling User's Manual, May 1993, Ademco Group, Author: unknown; pp. 1-54.

Ademco Group, 4281, 5881, and 5882 Series RF Receivers Installation Instructions, Oct. 1996, Ademco Group, Author: unknown; pp. 1-6.

Ademco Group, 5330 Alpha Console, Installation Instructions, May 1990, Ademco Group, Author: unknown, pp. 1-24.

Ademco Group, 5706 Smoke Detector with Built-In Wireless Transmitter, Installation Instructions, Dec. 1991, Ademco Group, Author: unknown, pp. 1-8.

Ademco Group, 5707 Smoke Detector with Built-in Wireless transmitter, Installation Instructions, Aug. 1992, Ademco Group, Author: unknown, pp. 1-12.

Ademco Group, 5715 Universal Transmitter, Installation Instructions, Mar. 1989, Ademco Group; Author: unknown; pp. 1-4.

Ademco Group, 5775 Passive Infrared Motion Detector/Transmitter, Installation Instructions, Jul. 1991, Ademco Group, Author: unknown; pp. 1-4.

Ademco Group, 5808C Photoelectronic Smoke Detector with Built-In Wireless Transmitter Installation Instructions, 1998, Ademco Group, Author: unknown; pp. 1-4.

Ademco Group, 5800TM Transmitter Module Installation Instructions, Apr. 1994, Ademco Group, Author: unknown; pp. 1.

Ademco Group, 5801 Remote Wireless Panic Transmitter Installation Instructions, Apr. 1994, Ademco Group, Author: unknown; pp. 2.

Ademco Group, 5802CP Belt Clip Transmitter Installation Instructions, Nov. 1994, Ademco Group, Author: unknown; pp. 1.

Ademco Group, 5802MN, Supervised Miniature Transmitter Installation Instructions, Jan. 1995, Ademco Group, Author: unknown; pp. 1.

Ademco Group, 5802MN2 Supervised Miniature Transmitter Installation Instructions, Jun. 1997, Ademco Group, Author: unknown; pp. 1.

Ademco Group, 5803 Wireless Key Transmitter Installation Instructions, Nov. 1994, Ademco Group, Author: unknown, pp. 2.

Ademco Group, 5804 Wireless Key Transmitter Installation Instructions, Jul. 1995, Ademco Group, Author: unknown, pp. 3.

Ademco Group, 5804BD Bi-Directional Key Transmitter Installation Instructions, Apr. 1997, Ademco Group, Author: unknown, pp. 4.

Ademco Group, 5806 Smoke Detector with Built-In Wireless Transmitter Installation Instructions, May 1998, Ademco Group, Author: unknown, pp. 1-4.

Ademco Group, 5807 Smoke Detector with Built-In Wireless Installation Instructions, May 1998, Ademco Group, Author: unknown, pp. 1-6.

Ademco Group, 5808 Photoelectronic Smoke/Heat Detector with Built-In Wireless Transmitter Installation Instructions, 1998, Ademco Group, Author: unknown, pp. 1-8.

Ademco Group, 5808 Wireless Smoke Detector, 1999, available at http://web.archive.org/web/20000118015507/www.ademco.com/ademco on Mar. 5, 2009 pp. 1-4.

Ademco Group, 5809 Rate-of Rise Heat Detector/Transmitter Installation Instructions, Nov. 1994, Ademco Group, Author: unknown; pp. 1-2.

Ademco Group, 5816 Door/Window Transmitter Installation Instructions, Nov. 1994, Ademco Group, Author: unknown; pp. 1-2.

Ademco Group, 5816TEMP Low Temperature Transmitter Installation Instructions, May 1998, Ademco Group, Author: unknown; pp. 1-2.

Ademco Group, 5818 Recessed Transmitter Installation Instructions, Jan. 1994, Ademco Group, Author: unknown; pp. 1-2.

Ademco Group, 5819 Shock Processor Transmitter Installation Instructions, May 1998, Ademco Group, Author: unknown; pp. 1-2.

Ademco Group, 5819WHS Wireless Shock Sensor and Processor, 1997, available at http://web.archive.org/web/19990428164624/www.ademco.com/ademco on Mar. 5, 2009, pp. 1.

Ademco Group, 5819WHS/5819BRS Shock Processor Transmitter Installation Instructions, May 1998, Ademco Group, Author: unknown; pp. 1-2.

Ademco Group, 5827 Remote Wireless Keypad/Transmitter Installation Instructions, Apr. 1994, Ademco Group, Author: unknown; pp. 1.

Ademco Group, 5827BD and 5827BDE Wireless Bi-Directional Keypads Installation Instructions and Operating Guide, Mar. 1996, Ademco Group, Author: unknown; pp. 1-6.

Ademco Group, 5849 Glass Break Detector/Transmitter Installation Instructions, Oct. 1997, Ademco Group, Author: unknown; pp. 1-4.

Ademco Group, 5850 Glass Break Detector/Transmitter Installation Instructions, May 1998, Ademco Group, Author: unknown; pp. 1-4.

Ademco Group, 5890 Passive Infrared Motion Detector/Transmitter Installation Instructions, May 1998, Ademco Group, Author: unknown; pp. 1-8.

Ademco Group, 5890 Wireless PIR Motion Detector, 1997, available at http://web.archive.org/web/19990429054256/www.ademco.com/asc on Mar. 5, 2009, pp. 1-3.

Ademco Group, 5890PI Passive Infrared Motion Detector/Transmitter Installation Instructions, Mar. 1998, Ademco Group, Author: unknown; pp. 1-4.

Ademco Group, 6128RF Keypad/Receiver—full wireless capability, 1997, Ademco Group, Author: unknown; pp. 1-2.

Ademco Group, 6128RF Keypad/Transceiver Installation Instructions, Jul. 1998, Ademco Group, Author: unknown; pp. 1-8.

Ademco Group, 6128RF Keypad/Transceiver, User Guide, May 1998, Ademco Group, Author: unknown; pp. 1.

Ademco Group, 6128WL Keypad/Receiver Installation Instructions, Oct. 1998, Ademco Group, Author: unknown; pp. 1-8.

Ademco Group, 6128WL Keypad/Receiver User Guide, Oct. 1998, Ademco Group, Author: unknown; pp. 1.

Ademco Group, 7715DF MicroFAST Installation Tool, User Manual, Feb. 1998, Ademco Group, Author: unknown; pp. 1-32.

Ademco Group, 7720 Subscriber Radio, Installation Instructions, Jan. 1992, Ademco Group, Author: unknown, available at http://www.guardianalarms.net, pp. 1-18.

Ademco Group, 7720NX Network Extender, 1997, Ademco Group, Author: unknown, available at http://web.archive.org/web/19990220035932/www.ademco.com/ademco on Mar. 5, 2009, pp. 1-3.

Ademco Group, 7720P Programming Tool, User Guide, Mar. 1992, Ademco Group, Author: unknown, available at http://www.guardianalarms.net; pp. 1-8.

Ademco Group, 7720Plus Subscriber Radio Installation Instructions, Oct. 1996, Ademco Group, Author: unknown, available at http://www.guardianalarms.net; pp. 1-30.

Ademco Group, 7720ULF Combination Fire Control and Long Range Radio Transmitter, 1997, Ademco Group, Author: unknown, available at http://web.archive.org/web/19990501_210612/www.ademco.com/ademco on Mar. 5, 2009, pp. 1-3.

Ademco Group, 7720ULF Subscriber Radio, Installation Instructions, Mar. 1995, Ademco Group, Author: unknown, available at http://www.guardianalarms.net, pp. 1-20.

Ademco Group, 7720V2 Self-Contained Long Range Radio Transmitter, 1997, Ademco Group, Author: unknown, available at http://web.archive.org/web/19990501212349/www.ademco.com/ademco on Mar. 5, 2009 pp. 1-4.

Ademco Group, 7720V2 Subscriber Radio, Installation Instructions, Jun. 1996, Ademco Group, Author: unknown, available at http://www.guardianalarms.net, pp. 1-24.

Ademco Group, 7810iR Internet Receiver, Installation and Setup Guide, May 2002, Ademco Group, Author: unknown, available at http://www.guardianalarms.net, pp. 1-58.

Ademco Group, 7820 Appendicies, Mar. 1995, Ademco Group, Author: unknown, available at http://www.guardianalarms.net, pp. 1-2.

Ademco Group, 7820 Integrated Radio Transmitter, Installation Instructions, Aug. 1995, Ademco Group, Author: unknown, available at http://www.guardianalarms.net, pp. 1-52.

Ademco Group, 7825 Outdoor Antenna with Bracket, Installation Instructions, Feb. 1995, Ademco Group, Author: unknown, available at http://www.guardianalarms.net, pp. 1-2.

Ademco Group, 7830R SafetyNet Subscriber Radio, Installation Instructions, Jun. 1996, Ademco Group, Author: unknown, available at http://www.guardianalarms.net, pp. 1-32.

Ademco Group, 7830R Subscriber Transmitter, 1997, available at http://web.archive.org/web/19990501215427/www.ademco.com.ademco on Mar. 5, 2009, pp. 1-3.

Ademco Group, 7835C Cellular Control Channel Transceiver, Installation and Setup Guide, Sep. 1998, Ademco Group, Author: unknown, available at http://www.guardianalarms.net, pp. 1-32.

Ademco Group, 7835C Cellular SafetyNet Subscriber Radio Transceiver, 1997Ademco Group, Author: unknown, available at http://web.archive.org/web/19990801221202/www.ademco.com/on Mar. 5, 2009, pp. 1-3.

Ademco Group, 7845C Cellular Control Channel Transceiver, Installation and Setup Guide, Sep. 1990, Ademco Group, Author: unknown, available at http://www.guardianalarms.net, pp. 1-104.

Ademco Group, 7845CZ Seven Zone Cellular Control Channel Transceiver, Installation and Setup Guide, Sep. 2001, Ademco Group, Author: unknown, available at http://www.guardianalarms.net, pp. 1-64.

Ademco Group, 7845i Internet Communications Module, Installation and Setup Guide, Mar. 2002, Ademco Group, Author: unknown, available at http://www.guardianalarms.net, pp. 1-42.

Ademco Group, 7920SE 900MHz Fully Synthesized Transceiver, 1997, Ademco Group, Author: unknown, available at http://web.archive.org/web/19990501222639/www.ademco.com/ on Mar. 5, 2009, pp. 1-3.

Ademco Group, 7920SE Transceiver, Installation Instructions, Apr. 1995, Ademco Group, Author: unknown, available at http://www.guardianalarms.net, pp. 1-80.

Ademco Group, Ademco World Leader in Home Security Products, 1997, Ademco Group, Author: unknown, available at http://web.archive.org/web/19990428164624/www.ademco.com/ademco on Mar. 5, 2009, pp. 1-2.

Ademco Group, AlarmNet Introduces Control Channel Cellular for Commercial Fire/Burglary Applications, Ademco Group (press release), Aug. 31, 1999, available at http://web.archive.org/web/19990420234120/www.ademco.com/pr0831 on Mar. 31, 2009.

Ademco Group, AlarmNet, 1997, Ademco Group, Author: unknown, available at http://web.archive.org/web/199904240234130/www.ademco.com/ademco on Mar. 5, 2009, pp. 1-3.

Ademco Group, Alpha Vista No. 5130XT Security System, Installation Instructions, Mar. 1989, Ademco Group, Author: unknown, pp. 96.

Ademco Group, Compass, 1997, Ademco Group, Author: unknown, available at http://web.archive.org/web/19990209094401/www.ademco.com/ademco on Mar. 5, 2009.

Ademco Group, Control/Communicator 5110XM User's Manual, Apr. 1996, Ademco Group, Author: unknown, pp. 1-30.

Ademco Group, Fire and Burglary System Model 5120XM User's Manual, Apr. 1996, Ademco Group, Author: unknown, pp. 1-40.

Ademco Group, Home Page, Ademco Group, Author: unknown, available at http://web.archive.org/web/19961023204954/http://ademco.com/ on Mar. 5, 2009, pp. 1.

Ademco Group, LYNX—Quick Install Security System, 1997, Ademco Group, Author: unknown, available at http://web.archive.org/web/19990116225005 pp. 1-3.

Ademco Group, Lynx Quick Start Guide, Oct. 1998, Ademco Group, Author: unknown, pp. 1-4.

Ademco Group, Lynx Security System Installation and Setup Guide, Oct. 1998, Ademco Group, Author: unknown, pp. 1-48.

Ademco Group, Lynx Security System Programming Form & Summary of Connections, Oct. 1998, Ademco Group, Author: unknown, pp. 1-16.

Ademco Group, Lynx Security System User Guide, Oct. 1998, Ademco Group, Author: unknown, pp. 1-40.

Ademco Group, Powerline Carrier Device Modules, 1997 Ademco Group, Author: unknown, available at http://web.archive.org/web/19990218035115/www.ademco.com/ademco on Mar. 5, 2009, pp. 1-2.

Ademco Group, Remote Keypads 6128, 6137, 6137R, 6138, 6139 & 6139R, Installation Guide, Aug. 1998, Ademco Group, Author: unknown, pp. 1-2.

Ademco Group, Security System Model 4110DL Programming Form, Oct. 1996, Ademco Group, Author: unknown, pp. 1-8.

Ademco Group, Security System Model 4110XM Programming Form, Jul. 1996, Ademco Group, Author: unknown, pp. 1-4.

Ademco Group, Security System Model 4120EC Programming Form, Sep. 1993, Ademco Group, Author: unknown, pp. 1-2.

Ademco Group, Security System Model 4120XM Programming Form, Sep. 1992, Ademco Group, Author: unknown, pp. 1-4.

Ademco Group, Security System Model 4130XT/4140/5130XT Programming Form, Jul. 1989, Ademco Group, Author: unknown, pp. 1-2.

Ademco Group, Security System Model 4140XMP Programming Form, Jan. 1992, Ademco Group, Author: unknown, pp. 1-2.

Ademco Group, Security System Model 4140XMPT2 Programming Form, Apr. 1996, Ademco Group, Author: unknown, pp. 1-4.

Ademco Group, Security System Model 5110XM Programming Form, Apr. 1996, Ademco Group, Author: unknown, pp. 1-4.

Ademco Group, Security System Model 5120XM Programming Form, Jun. 1996, Ademco Group, Author: unknown, pp. 1-4.

Ademco Group, Security System Model 5140XM Programming Form, Jun. 1993, Ademco Group, Author: unknown, pp. 1-4.

Ademco Group, Security System Model Vista-10 Programming Form, Sep. 1994, Ademco Group, Author: unknown, pp. 1-4.

Ademco Group, Security System Model Vista-10SE Programming Form, Apr. 1997, Ademco Group, Author: unknown, pp. 1-24.

Ademco Group, Security System Model Vista-128B Commercial Burglary Partitioned Security System with Scheduling, Quick Start Guide, Jun. 1998, Ademco Group, Author: unknown, pp. 1-39.

Ademco Group, Security System User's Manual, Sep. 1996, Ademco Group, Author: unknown, pp. 1-88.

Ademco Group, The Vista-100 Series, 1997, Ademco Group, Author: unknown, available at http://web.archive.org/web19970620010543/www.ademco.com/ademco on Mar. 5, 2009.

Ademco Group, The Vista-10SE, 1997, Ademco Group, Author: unknown, available at http://web.archive.org/web/19990502214402/www.ademco/com/ademco on Mar. 5, 2009, pp. 1-4.

Ademco Group, via16 Programming Form, Jul. 1993, Ademco Group, Author: unknown, pp. 1-2.

Ademco Group, vial 16 Security System, Installation Instructions, Jan. 1992, Ademco Group, Author: unknown, pp. 1-24.

Ademco Group, via-30+, Vista 10, 4111XM Security System User's Manual, Jul. 1994, Ademco Group, Author: unknown, pp. 1-44.

Ademco Group, via-30Pse Security System Programming Guide, Apr. 1997, Ademco Group, Author: unknown, pp. 1-24.

Ademco Group, via-30PSE, Vista-1SE Security System User's Manual, Jan. 1997, Ademco Group, Author: unknown, pp. 1-88.

Ademco Group, Vista 4120XM and 4140XMP Security System User's Manual, Jan. 1994, Ademco Group, Author: unknown, pp. 1-60.

Haartsen, "Bluetooth—The Universal Radio Interface for Ad Hoc, Wireless Connectivity;" Ericsson Review No. 3, 1998; pp. 110-117.

Hahn et al., "Packet Radio Network Routing Algorithms: A Survey," IEEE Communications Magazine, vol. 22, No. 11, Nov. 1984, pp. 41-47.

HAI Omni, Features & Specifications, Home Automation, Inc., available at http://web.archive.org/web/19970216055832/www.homeauto.com/omni on Feb. 17, 2009, pp. 1-6.

Hall, "Tactical Internet System Architecture for Task Force XXI," 1996 IEEE, pp. 219-230.

Hamilton et al., "Optimal Routing in Multihop Packet Radio Networks," 1990 IEEE, pp. 389-396.

Harrington, "More Visible Vehicles," ActionLINE, Jul. 2003 (4 pages).
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.Ietf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co m/_/print/PrintArticle.aspx?id=18414624, pp. 1-3.
Home Toys, Inc., "HTINews Review," available at http://www.hometoys.com/htinews/aug97/reviews/homevis/homevis1.htm on Mar. 2, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.
Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Stargate Interactive Automation System," 1998, pp. 1-2.
JDS Technologies, "Stargate, Operation Manual," Mar. 2000, pp. 1-114.
JDS Technologies, "Support: Protocol Specifications," available at http://jdstechnologies.com/protocol.htm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et al., "Centralized Packet Radio Network: A Communication Approach Suited for Data Collection in a Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.
Johnson et al., "Protocols for Adaptive Wireless and Mobile Networking," IEEE Personal Communications, 3(1), Feb. 1996, pp. 1-18.
Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.

Johnson, "Mobile Host Internetworking Using IP Loose Source Routing," Carnegie Mellon University CMU-CS-93-128, DARPA Order No. 7330, Feb. 1993, pp. 1-18.
Johnson, "Routing in Ad Hoc Networks of Mobile Hosts," 1995 IEEE, pp. 158-163.
Johnson, "Scalable and Robust Internetwork Routing for Mobile Hosts," 1994 IEEE, pp. 1-11.
Jubin, "Current Packet Radio Network Protocols," Proc. of the IEEE Infocom (Mar. 26-28, 1985), pp. 86-92.
Kaashoek et al., "FLIP: An Internetwork Protocol for Supporting Distributed Systems," ACM Transactions on Computer Systems, vol. 11, No. 1, Feb. 1993, pp. 73-106.
Kaiser et al., "Low Power Wireless Integrated Microsensors (LWIM), Request for Support to Project", UCLA Electrical Engineering Department, Rockwell Science Center, Sep. 13, 1994, 71 pages.
Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.
Brownrigg et al., "Technical Services in the Age of Electronic Publishing," Library Resource & Technical Services, Jan./Mar. 1984, pp. 59-67.
Brownrigg et al., "User Provided Access to the Internet," available at http://web.simmons.edu/~chen/nit/NIT'92/033-bro.htm, Jun. 9, 2005, pp. 1-6.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bult et al. Low Power Systems for Wireless Microsensors, UCLA Electrical Engineering Department, 1996 ISLPED, pp. 1-5.
Bult et al., "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Angeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
CADDX-CADDI Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts," 1996 IEEE, Proceedings of the 16th ICDCS, pp. 319-326.
Cisco Systems, Inc., Enhanced Interior Gateway Routing Protocol, Cisco Systems, Inc., Updated Sep. 9, 2005, pp. 1-44.
Cisco Systems, RFC1812-Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," WATER/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n_11_v93/ai_147 70465/?tag=content;col1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector© 1000 Series, Coactive, 2000, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.
Coactive Networks, Inc., Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Corbell et al., "Technical Implementation in Support of the IAEA's Remote Monitoring Field Trial at the Oak Ridge Y-12 Plant," Dept. of Energy, Office of Scientific and Technical Information, Report No. SAND—096-1934C, available at http://www.osti.gov/bridge/product.biblio.jsp?qu ery_id=1&page=0&osti_id=270678 (1996).
Corbell et al., "Technical Results of Y-12/IAEA Field Trial of Remote Monitoring System," Dept. of Energy, Office of Scientific and Technical Information, Report No. SAND—97-1781C, available at http://www.osti.gov/bridge/product.biblio.jsp?query_id=0&page=0&osti_id=505711 (1997).
Corcoran et al., "Browser-Style Interfaces to a Home Automation Network," IEEE Transactions on Consumer Electronics, vol. 43, No. 4, Nov. 1997, pp. 1063-1069.
Corcoran et al., "CEBus Network Access via the World-Wide-Web," available at http://ieeexplore.ieee.org/xpl/freeabs_all.jsp?arnumber= 517285, on Mar. 29, 2009, Paper published on Consumer Electronics, 1996, Digest of Technical Papers, pp. 236-237.
Corcoran et al., "CEBus Network Access via the World-Wide-Web," IEEE, 1996.
Corson et al., "Architectural Considerations for Mobile Mesh Networking," Milcom '96 Conference Proceedings vol. 1 of 3, Oct. 22-24, 1996, pp. 225-229.
Corson et al., "Internet-Based Mobile Ad Hoc Networking," IEEE Internet Computing, Jul.-Aug. 1999, pp. 63-70.
Court's claim construction Order dated Feb. 10, 2009, in *Sipco LLC et al. v. The Toro Co. et al.*, Case No. 2:08-cv-00505-TJS (E.D. Pa.).
Custom Solutions, Inc. Acessories, available at http://web.archive.org/web/19981206221844/www.csi3.com/hv_pv4.htm on Feb. 27, 2009, pp. 1-3.
Custom Solutions, Inc., HomAtion 2000 for HomeVision, Press Release, available at http://web.archive.org/web/19981207075734/www.csi3.com/HV_PR_0 on Feb. 27, 2009, pp. 1-2.
Custom Solutions, Inc., HomeVision 2.7, Document Purpose, Date: unknown, pp. 1-28.
Custom Solutions, Inc., HomeVision 2.7e, Owner's Manual (1999); pp. 1-596.
Custom Solutions, Inc., HomeVision Description, available at http://web.archive.org/web/19981206004955/http://www.csi3.com/HV.htm on Mar. 2, 2009, pp. 1-14.
Custom Solutions, Inc., HomeVision-PC Description, available at http://web.archive.org/web/19981205094024/http://www.csi3.com/hv_pc.htm on Mar. 2, 2009, pp. 1-6.
Custom Solutions, Inc., HomeVision-PC Software, available at http://web.archive.org/web/19990224053817/http://www.csi3.com/hvp3pc.htm on Feb. 27, 2009, pp. 1-2.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.
Kemp, "Home Automation Application Guide," Applications for Home Automation in Any Home, vol. 1, 2000, pp. 1-106.

Kleinrock et al., "Hierarchical Routing for Large Networks, Performance Evaluation, and Optimization," Computer Networks 1 (1977), pp. 155-174.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Lacoss, "Distributed Sensor Networks, Final Report," Lincoln Laboratory at Massachusetts Institute of Technology, Sep. 30, 1986, pp. 1-225.
Lauer et al., "Survivable Protocols for Large Scale Packet Radio Networks," IEEE Global Telecommunications Conference, Nov. 26-29, 1984, vol. 1 of 3, pp. 468-471.
Lauer, "Packet-Radio Routing, Routing in Communications Networks," Ch. 11 (1995) pp. 351-396.
Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.
Leiner et al., "Goals and Challenges of the DARPA GloMo Program;" IEEE Personal Communications; Dec. 1996, vol. 3, No. 6; pp. 34-45.
Leviton Manufacturing Co., Inc., "The DECORA® Collection of Designer Devices," 2006, pp. 1-85.
Lewis et al., "Packet-Switching Applique for Tactical VHF Radios," 1987 IEEE Military Communications Conference, Oct. 19-22, 1987, Conference Record vol. 2 of 3, pp. 449-455.
Lin et al., "CMOS Front End Components for Micropower RF Wireless Systems;" EED, UCLA Electrical Engineering Department; 1998, pp. 1-5.
Linear Corporation, "Supervised Digital Security Transmitter t-90, Installation Instructions," 2006, pp. 1-2.
Linear Corporation, "Supervised Digital Security Transmitters TX-91, TX-92, TX-94, Operation Instructions," 1993, pp. 1.
Linear Corporation, "Supervised Wireless Receiver and Zone Expander SRX-64A, Installation Instructions," 2003, pp. 1-2.
Local and Metropolitan Area Networks: Wireless Medium Access Control (MAC) and Physical (PHY) Specifications, Author: unknown; IEEE, Nov. 1997, pp. 1-98.
Clare, "AWAIRS Progress Review: Planned Milestones," UCLA Rockwell Science Center, Nov. 20, 1998.
Lougheed et al., "A Border Gateway Protocol 3 (BGP-3)," RFC 1267, (Oct. 1991), available at http://tools.ietf.org/html/rfc1267, Jun. 24, 2009, pp. 1-36.
Lutron Electronics Co. Inc., Homeowner's Guide for the RadioRA® Quick Start Package, 2004, pp. 1-8.
Lutron Electronics Co. Inc., How to Retrofit RadioRA® Wall-Mounted Master Control into an existing home, Application #41, 2004, pp. 1-2.
Lutron Electronics Co. Inc., IR/RS232 Interface for Bang & Olufsen® Remote Control and RadioRA®, Application Note #119, 2004, pp. 1-3.
Lutron Electronics Co. Inc., Level Capture with a RadioRA® Master Control, Application Note #73, 2003, pp. 1-3.
Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc., Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a GRAFIK Eye® Control Unit, Application Note #48, 1998, pp. 1-4.

Lutron Electronics Co. Inc., Using the RadioRA® Telephone Interface, Application Note #46, 1998, pp. 1-2.

Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.

Lynch et al., "Beyond the Integrated Library System Concept: Bibliographic Networking at the University of California," Proceedings of the Second National Conference on Integrated Online Library Systems Proceedings, Sep. 1984, pp. 243-252.

Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.

Lynch et al., "Document Delivery and Packet Facsimile," Proceedings of the 48th ASIS Annual Meeting, vol. 22, Oct. 20-24, 1985, pp. 11-14.

Lynch et al., "Electronic Publishing, Electronic Imaging, and Document Delivery, Electronic Imaging '86," (Boston, MA: Institute for Graphic Communication, Inc., 1986), pp. 662-667.

Lynch et al., "Library Applications of Electronic Imaging Technology," Information Technology and Libraries, Jun. 1986, pp. 100-105.

Lynch et al., "Packet Radio Networks: Architectures, Protocols, Technologies and Applications," Pergamon Press, 1 ed., 1987, pp. 1-275.

Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.

Lynch et al., "The Telecommunications Landscape: 1986," Library Journal, Oct. 1, 1986, pp. 40-46.

Rehkter et al., "A Border Gateway Protocol 4 (BGP-4)," RFC 1771, (Mar. 1995), available at http://tools.ietf.org/html.rfc1771, Jun. 24, 2009, pp. 1-58.

Reuters, "Verizon Launches Wi-Fi Hot Spots," May 18, 2003, http://www.wired.com/news/wireless/0,1382,58830,00.html (2 pages).

Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.

Ross et al., "PNC/DOE Remote Monitoring Project at Japan's Joyo Facility," Office of Scientific and Technical Information, Report No. SAND—96-1937C, available at http://www.osti.gov/bridge/product.bib lio.jsp?query_id=0&pa ge=0&osti_id=270680 (1996).

Saffo, Paul, "Sensors: The Next Wave of Infotech Innovation," Institute for the Future (1997).

Salkintzisa et al., "Design and implementation of a low-cost wireless network for remote control and monitoring applications," Elservier, Microprocessors and Microsystems, 1997, pp. 79-88.

Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.

Schneider et al., "International Remote Monitoring Project Argentina Nuclear Power Station Spent Fuel Transfer Remote Monitoring System," Dept. of Energy, Office of Scientific and Technical Information, Report No. SAND—97-1784C, available at http://www.osti.gov/bridge/product.bibli o.jsp?query_id=1&page=0&osti_id=505674 (1997).

Schulman et al., "SINCGARS Internet Controller—Heart of the Digitized Battlefield," Proceedings of the 1996 Tactical Communications Conference, Apr. 30-May 2, 1996, pp. 417-421.

Shacham et al., "A Packet Radio Network for Library Automation," 1987 IEEE Military Communications Conference, vol. 2, at 21.3.1 (Oct. 1987); pp. 456-462.

Shacham et al., "Future Directions in Packet Radio Architectures and Protocols," Proceedings of the IEEE, vol. 75, No. 1, Jan. 1987, pp. 83-99.

Shacham et al., "Future Directions in Packet Radio Technology," Proceedings of IEEE Infocom 85, Mar. 26-28, 1985, pp. 93-98.

Shacham et al., "Packet Radio Networking," Telecommunications vol. 20, No. 9, Sep. 1986, pp. 42,43,46,48,64 and 82.

Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.

Sohrabi et al., Protocols for Self-Organization of a Wireless Sensor Network, IEEE Personal Communications, Oct. 2000, pp. 16-27.

Stern, "Verizon to Offer Wireless Web Link Via Pay Phones," May 10, 2003, http://www.washingtonpopst.com/ac2/wp-dyn?pagename=article&node=&contentID=A367 . . . (3 pages).

Subramanian et al., An Architectural for Building Self-Configurable Systems, IEEE, 2000, pp. 63-73.

Sunshine, "Addressing Problems in Multi-Network Systems," (Apr. 1981), available at ftp://ftp.isi.edu/in-notes/ien/ien178.txt, Sep. 14, 2009, pp. 1-26.

Sunshine, "Addressing Problems in Multi-Network Systems," Proceedings Infocom '82, 1982 IEEE, pp. 12-19.

Sunshine, "Network Interconnection and Gateways," IEEE Journal on Selected Areas in Communications, vol. 8, No. 1, Jan. 1990, pp. 4-11.

Sunshine, "Source Routing in Computer Networks," Information Sciences Department of the Rand Corporation (1977), Publisher: unknown, pp. 29-33.

Sutherland, Ed, "Payphones: The Next Hotspot Wave?," Jan. 28, 2003, http://www.isp-planet.com/fixed_wireless/news/2003/bellcanada_030128.html (3 pages).

Tanenbaum, "Computer Networks," 4th Int'l CAN Conf., Berlin, Germany, 1997.

Thodorides, "Wireless Integrated Network Sensors," Power Point Presentation, Publisher: unknown, Apr. 15, 2003, pp. 1-19.

Thomas, "Extending CAN Networks by Incorporating Remote Bridging," ESTeem Radios, Nov. 1994.

Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).

Tobagi et al, "Packet Radio and Satellite Networks," IEEE Communications Magazine, vol. 22, No. 11, Nov. 1984, pp. 24-40.

Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.

Totolo, Home RF, A New Protocol on the Horizon, Feb. 1999, available at www.hometoys.com/htinews/feb99/articles/totolo/totolo.htm on Mar. 2, 2009.

Transmission Control Protocol; "DARPA Internet Program Protocol Specification," John Postel Editor; Information Sciences Institute, University of Southern California, California; Sep. 1981; pp. 1-85.

Varadhan et al., "SDRP Route Construction," Internet Draft, available at draft-ietf-sdr-route-construction-01.{ps,txt}, Feb. 27, 2005, pp. 1-12.

Vardhan, "Wireless Integrated Network Sensors (WINS): Distributed In Situ Sensing for Mission and Flight Systems," 2000 IEEE Aerospace Conference Proceedings, (2000).

Verizon, "Verizon Broadband Anytime," Copyright 2003, https://www33.verizon.com/wifi/login/loacations/locations-remote.jsp (2 pages).

Wang et al., "Energy-Scalable Protocols for Battery Operated MicroSensor Networks," Department of Electrical Engineering Massachusetts Institute of Technology, 1999.

Warrock, "School Give Report on Radio-Based FMS," Energy User News, Nov. 7, 1983, pp. 1.

Weiser, "Some Computer Science Issues in Ubiquitous Computing," Communications of the ACM, Jul. 1993.

Weiser, "The Computer for the 21st Century," Scientific American, Sep. 1991.

Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.

Westcott et al., "Hierarchical Routing for Very Large Networks," IEEE Military Communications Conference, Oct. 21-24, 1984, Conference Record vol. 2, pp. 214-218.

Westcott, "Issues in Distributed Routing for Mobile Packet Radio Networks," Proceedings of Computer Networks Compcon '82, Sep. 20-23, 1982, pp. 233-238.

Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.

Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.

Wikipedia, "Border Gateway Protocol," available at http://en.wikipedia.org/wiki/Border_Gateway_Protocol, Jun. 24, 2009, pp. 1-13.

Wikipedia, "Distance-Vector Routing Protocol," available at http://en.wikipedia.org/wiki/Distance-Vector_Routing_Protocol, Jun. 24, 2009, pp. 1-4.

Wikipedia, "Enhanced Interior Gateway Routing Protocol," available at http://en.wikipedia.org/wiki/EIGRP, Jun. 24, 2009, pp. 1-7.

Wikipedia, "Exterior Gateway Protocol," available at http://en.wikipedia.org/wiki/Exterior_Gateway_Protocol, Jun. 24, 2009, pp. 1.

Wikipedia, "Interior Gateway Routing Protocol," available at http://en.wikipedia.org/wiki/Interior_Gateway_Routing_Protocol, Jun. 24, 2009, pp. 1-2.

Wikipedia, "IS-IS," available at http://en.wikipedia.org/wiki/IS-IS, Jun. 24, 2009, pp. 1-3.

Wikipedia, "L. R. Ford, JR.," available at http://en.wikipedia.org/wiki/L._R._Ford,_Jr, Jun. 24, 2009, pp. 1.

Wikipedia, "Richard E. Bellman," available at http://en.wikipedia.org/wiki/Richard_Bellman, Jun. 24, 2009, pp. 1-3.

Wikipedia, "Routing Information Protocol," available at http://en.wikipedia.org/wiki/Routing_Information_Protocol, Jun. 24, 2009, pp. 1-4.

Will et al., "Wireless Networking for Control and Automation of Off-road Equipment," ASAE, Jul. 18-21, 1999, pp. 1-10.

Wilson, Lexicon 700t Touchscreen Remote, Jan. 1, 1999, available at http://avrev.com/home-theater-remotes-system-control/remotes-system on Mar. 2, 2009, pp. 1-3.

Nunavut et al., Web Based Remote Security System (WRSS) Model Development, IEEE, Apr. 7-9, 2000, pp. 379-382.

X10, "CK11A ActiveHome, Home Automation System, Owner's Manual," Oct. 23, 1997, pp. 1-56.

X10.com: The Supersite for Home Automation, "What's in the Kit," available at http://web.archive.org/web/19991111133453/www.com/products/x, on Mar. 2, 2009, pp. 1-2.

X10.com: The Supersite for Home Automation, "Wireless Remote Control System (RC5000)," available at http://web.archive.org/web/1999111453227/www.x10.com/products/x1 on Mar. 2, 2009, pp. 1.

X10: The Supersite for Home Automation, "Transceiver Module," available at http://web.archive.org/web/20000229141517/www.x10.com/products/x on Mar. 2, 2009, pp. 1.

Xecom Incorporated, "EX900S Smart Spread Spectrum Transceiver," Nov. 2003 (13 pages).

Young, "USAP: A Unifying Dynamic Distributed Mulitchannel TDMA Slot Assignment Protocol," Rockwell International Communication Systems Division, IEEE (1996).

Yu, "Target Identification Processor for Wireless Sensor Network," Dissertation, Los Angeles: University of California, 1999, pp. 1-110.

Zander et al., "The SOFTNET Project: A Retrospect," 1988 IEEE, pp. 343-345.

Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.

Kahn et al., Advances in Packet Radio Technology, Proceedings of the IEEE, vol. 66, No. 11, pp. 1468-1496 (Nov. 1978).

Agre et al., "Development Platform for Self-Organizing Wireless Sensor Networks," Rockwell Science Center and UCLA, Date:Apr. 1999, pp. 257-268.

Kahn, "The Organization of Computer Resources into a Packet Radio Network," IEEE, Jan. 1977, vol. Com-25 No. 1, pp. 169-178.

Rosen, "Exterior Gateway Protocol (EGP)," Bolt Beranek and Newman Inc., Oct. 1982, pp. 1-48.

Ademco Group, Control/Communicator 5110XM Installation Instructions, Apr. 1996, Ademco Group, Author: unknown, pp. 1-76.

Ademco Group, Vista-128FB Commercial Fire and Burglary Partitioned Security System Quick Start Guide, Oct. 1998, Ademco Group, Author: unknown, pp. 1-68.

Brain, "How Motes Work: A Typical Mote," available at http://computer.howstuffworks.com/mote4.htm, on Feb. 25, 2010, pp. 1-2.

Ademco Group, Vista 4130XT Security System Installation Instructions, Oct. 1998, Ademco Group, Author: unknown, pp. 1-84.

Ademco Group, Vista 4140XMPT2 Partitioned Security System with Scheduling Installation Instructions, May 1993, Ademco Group, Author: unknown, pp. 1-68.

Ademco Group, Vista AT 4140 Security System Installation Instructions, Sep. 1998, Ademco Group, Author: unknown, pp. 1-68.

Ademco Group, Vista Series 4120EC Security System User's Manual, Sep. 1992, Ademco Group, Author: unknown, pp. 1-28.

Ademco Group, Vista Series 4130XM, 5130XM, 4140XMP Security System User's Manual, Feb. 1992, Ademco Group, Author: unknown, pp. 1-32.

Ademco Group, Vista Series 4140XMPT/4140XMPT-UL Partitioned Security System User's Manual, Jun. 1993, Ademco Group, Author: unknown, pp. 1-32.

Ademco Group, Vista Series 4140XMP, Installation Instructions, Jan. 1992, Ademco Group, Author: unknown, pp. 1-52.

Ademco Group, Vista Series 5140XM User's Manual, Aug. 1992, Ademco Group, Author: unknown, pp. 1-28.

Ademco Group, Vista XM Series 4140XM, 5130XM, 4130XM, Installation Instructions, Jul. 1990, Ademco Group, Author: unknown, pp. 1-26.

Ademco Group, Vista XM Series, Installation Instructions, Ademco Group, Author: unknown, Oct. 1991, pp. 1-16.

Ademco Group, Vista-10 Security System, Installation Instructions, Sep. 1994, Ademco Group, Author: unknown, pp. 1-56.

Ademco Group, Vista-100 Commercial Fire & Burglary Alarm Partitioned Security System with Scheduling, Installation Instructions and Programming Guide, Jan. 1998, Ademco Group, Author: unknown, pp. 1-233.

Ademco Group, Vista-100 Commercial Fire & Burglary Alarm System User's Manual, Nov. 1995, Ademco Group, Author: unknown, pp. 1-66.

Ademco Group, Vista-100 Commercial Fire & Burglary Alarm System with Scheduling Quick Start, Apr. 1996, Ademco Group, Author: unknown, pp. 1-24.

Ademco Group, Vista-10SE Security System, Installation Instructions, May 1997, Ademco Group, Author: unknown, pp. 1-88.

Ademco Group, Vista-128B Commercial Burglary Partitioned Security System with Scheduling, Installation and Setup Guide, Jul. 1998, Ademco Group, Author: unknown, pp. 1-252.

Ademco Group, Vista-128FB Commercial Fire and Burglary Partioned Security System with Scheduling, Installation, and Setup Guide, Oct. 1998, Ademco Group, Author: unknown, pp. 1-220.

Ademco Group, Vista-128FB Commercial Fire and Burglary Partitioned Security System User Guide, Oct. 1998, Ademco Group, Author: unknown, pp. 1-80.

Ademco Group, Vista-20 2-Partitioned Security System, Installation Instructions, Nov. 1995, Ademco Group, Author: unknown, pp. 1-120.

Ademco Group, Vista-20 2-Partitioned Security System, Programming Form, Apr. 1996, Ademco Group, Author: unknown, pp. 1-8.

Ademco Group, Vista-20 Security System User's Manual, Apr. 1995, Ademco Group, Author: unknown, pp. 1-52.

Ademco Group, Vista-20HW 2-Partitioned Security System, Installation Instructions, Apr. 1996, Ademco Group, Author: unknown, pp. 1-100.

Ademco Group, Vista-20HW 2-Partitioned Security System, Programming Form, Apr. 1996, Ademco Group, Author: unknown, pp. 1-8.

Ademco Group, Vista-20HWse 2-Partitioned Security System, Installation Instructions, Aug. 1997, Ademco Group, Author: unknown, pp. 1-84.

Ademco Group, Vista-20HWse 2-Partitioned Security System, Programming Form, Aug. 1997, Ademco Group, Author: unknown, pp. 1-8.

Ademco Group, Vista-20SE 2-Partitioned Security System, Installation Instructions, Aug. 1997, Ademco Group, Author: unknown, pp. 1-100.
Ademco Group, Vista-20SE 2-Partitioned Security System, Programming Guide, Aug. 1997, Ademco Group, Author: unknown, pp. 1-8.
Ademco Group, Vista-20SE/Vista-20HWse Security System User's Manual, Jun. 1997, Ademco Group, Author: unknown; pp. 1-52.
Ademco Group, Vista-30Pse Security System, Installation Instructions, Apr. 1997, Ademco Group, Author: unknown; pp. 1-104.
Ademco Group, Vista-40 2-Partition Security System, Installation and Setup Guide, Jul. 1998, Ademco Group, Author: unknown; pp. 1-380.
Ademco Group, Vista-40 2-Partition Security System, Programming Guide, Jul. 1998, Ademco Group, Author: unknown; pp. 1-24.
Ademco Group, Vista-40 Programming Guide, Jun. 1997, Ademco Group, Author: unknown; available at www.guardianalarms.net pp. 1-20.
Ademco Group, Vista-40 Security System User's Guide, Jul. 1998, Ademco Group, Author: unknown; pp. 1-60.
Ademco Group, Vista-50, Vista 50UL Security System, Nov. 1994, Ademco Group, Author: unknown; pp. 1-66.
Ademco Group, Vista-50P, Vista-50PUL Partitioned Security System with Scheduling, Installation Instructions and Programming Guide, Oct. 1997, Ademco Group, Author: unknown; pp. 1-199.
Ademco Group, Vista-50P, Vista-50PUL Security System User's Manual, Jul. 1995, Ademco Group, Author: unknown; pp. 1-66.
Ademco Group, Vista-50P, Vista-50PUL, Partitioned Security System with Scheduling, Quick Start, Aug. 1995, Ademco Group, Author: unknown; pp. 1-28.
Ademco Group, Vista5140XM Commercial Fire and Burglary Alarm System Installation Instructions, Jun. 1993, Ademco Group, Author: unknown, pp. 1-74.
Ademco Group, Vista-AT Security System User's Manual, Sep. 1998, Ademco Group, Author: unknown; pp. 1-56.
Ademco Group, V-Link Downloading Software User's Guide, Jun. 1994, Ademco Group, Author: unknown; available at http://www.guardianalarms.net, pp. 1-126.
Ademco Group, V-Plex Security Technology, 1997, Ademco Group, Author: unknown, available at http://web.archive.org/web/19990421110527/www.ademco.com/ademco on Mar. 5, 2009, pp. 1-6.
Ademco Group, Wireless Transmitters/Receivers: 5700 Wireless Transmitters, 1997, Ademco Group, Author: unknown, available at http://web.archive.org/web/19990127120423/www.ademco.com/ademco on Mar. 5, 2009, pp. 1-2.
Ademco Group, Wireless Transmitters/Receivers: 5800 Wireless Transmitters, 1997, Ademco Group, Author: unknown, available at http://web.archive.org/web/19990218181254/www.ademco/com/ademco on Mar. 5, 2009, pp. 1-2.
Ademco Group, Wirelss User Interface Devices, 1997, Ademco Group, Author:.unknown, available at http://web.archive.org/web/19990421190353/www.ademco.com/ademco on Mar. 5, 2009, pp. 1-4.
Ademco Group,Vista Series Partitioned Security Systems Model 4140XMPT Installation Instructions, Feb. 1992, Ademco Group, Author: unknown, pp. 1-60.
AES—7700 Central Station, Installation & Operation Manual, Document 40/0551u, AES Corporation, Author: unknown, Nov. 2003, pp. 1-40.
AES—IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES IntelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.

AES 7750-F RF Smart Subscriber Unit Version 2, Including 7750-F-4×4 and 7750-F-8, Installation & Operation Manual, AES IntelliNet, Author: unknown, Apr. 2001 (Updated Nov. 2003), pp. 1-60.
AES 7750-F RF Smart Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
MacGregor et al., "Multiple Control Stations in Packet Radio Networks", Bolt, Beranek and Newman, Inc., Cambridge, MA, IEEE 1982, pp. 10.3-1-10.3-5, 1982.
Mak et al., "Design Considerations for Implementation of Large Scale Automatic Meter Reading Systems," IEEE Transactions on Power Delivery, vol. 10, No. 1, Jan. 1995, pp. 97-103.
Malkin, "RFC 2453, RIP Version 2 (Nov. 1998)," available at http://tools.ietf.org/html/rfc2453, Jun. 24, 2009, pp. 1-40.
Maltz, "On-Demand Routing in Multi-Hop Wireless Mobile Ad Hoc Networks,"Thesis, May 2001, pp. 1-192.
Markie et al., "LonWorks and PC/104: A winning combination," PC/104 Embedded Solutions, Summer 1998, pp. 1-8.
McQuillan et al., "The ARPA Network Design Decisions," Computer Networks, vol. 1, No. 5, Aug. 1977 pp. 243-289.
McQuillan et al., "The New Routing Algorithm for the ARPANET," IEEE Transactions on Communications, vol. COM-28, No. 5, May 1980, pp. 711-719.
Mills, "Exterior Gateway Protocol Formal Specification" (Apr. 1984), RFC 904, available at http://tools.ietf.org/html/rfc904, Jun. 24, 2009, pp. 1-32.
Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).
Moy, "RFC 2328, OSPF Version 2 (Apr. 1998)," available at http://tools.ietf.org/html/rfc2328, Jun. 24, 2009, pp. 1-245.
Mozer et al., "The Neural Network House: An Overview," in L. Niklasson & Boden (eds.), Current trends in connectionism (pp. 371-380); Hillsdale: Erlbaun, 1995; pp. 1-9.
Murthy et al., "An Efficient Routing Protocol for Wireless Networks, Mobile Networks and Applications 1," (1996), pp. 183-197.
Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.
Nextgen Searches, "IPCO v. The Wireless Sensor Network Industry? Special Report on IPCO v. Oncor et al.," Corporate Manager's Edition, 2009, pp. 1-16.
Nilsen et al., "Storage Monitoring Systems for the Year 2000," Dept. of Energy, Office of Scientific and Technical Information, Report No. SAND—97-8532C, available at http://www.osti.gov/bridge/product.bibliodsp?query_id=3&page=0&osti_id=303988 (1997).
Ondo, "PLRS/JTIDS Hybrid," Filled Artillery Journal, Jan.-Feb. 1981, pp. 20-25.
Oran (ed.), "OSI IS-IS Intra-Domain Routing Protocol," RFC 1142 (Feb. 1990), available at http://tools.ietf.org/html/rfc1142, Jun. 24, 2009, pp. 1-665.
Park et al., "SensorSim: A Simulation Framework for Sensor Networks," ACM, 2000, pp. 104-111.
Perkins et al., "Ad-Hoc On-Demand Distance Vector Routing "AODV"," http://moment.cs.ucsb.edu/AODV/aodv.html, Aug. 25, 2009, pp. 1-5.

Perkins et al., "Continuous, transparent network access for portable users, A Mobile Networking System Based on Internet Protocol," IEEE Personal Communications, First Quarter 1994, pp. 32-41.

Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.

Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.

Perkins et al., "RFC3561—Ad Hoc On-Demand Distance Vector (AODV) Routing (Jul. 2003)," available at http://tools.ietf.org/html?rfc 3561, Aug. 25, 2009, pp. 1-38.

Pittway Corporation, "Company History," available at http://www.fundinguniverse.com/company-histories/Pittway-Corporation Mar. 6, 2009, pp. 1-5.

Plaintiffs' Opening Markman Brief in Support of Their Proposed Claim Constructions, filed by the patent owner and its co-plaintiff in *SIPCO LLC et al. v. The Toro Co. et al.*, Case No. 2:08-cv-00505-TJS (E.D. Pa.) filed on Sep. 26, 2008.

Pleading—Defendant Digi International Inc.'s First Amended Answer and Defenses of *SIPCO, LLC v. CONTROL4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant Siemens Industry, Inc.'s First Amended Answer and Defenses of *SIPCO, LLC v. CONTROL4 Corporation et al.*, Civil Action No. 6:10-cv-249, currently pending in the U.S. District Court for the Eastern District of Texas, Tyler Division, filed Nov. 22, 2010, pp. 1-27.

Pleading—Defendant The Toro Company, The Toro Company's Second Supplemented Objections and Answers to Plaintiffs SIPCO LLC and Advanced Sensor Technology, Inc.'s Interrogatory No. 4 to Defendant The Toro Company of *SIPCO LLC, et al. v. The Toro Company et al.*, Civil Action No. 08-CV-00505-TJS (pp. 1-9).

Poor, Robert D., "Hyphos: A Self-Organizing, Wireless Network," Massachusetts Institute of Technology (Jun. 1997).

Postel (ed.), "Transmission Control Protocol, Version 4," RFC793, available at http://www.faqs.org/rfcs/rfc793.html, Sep. 1981, pp. 1-85.

Postel (Editor), "Internet Protocol, DARPA Internet Program Protocol Specification," RFC 791 (Sep. 1981), Information Sciences Institute, University of So. Cal., pp. 1-45.

Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.

Pottie et al., "Wireless Integrated Network Sensors," Communications of the ACM, vol. 43, No. 5, May 2000, pp. 51-58.

Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.

Pottie, "AWAIRS: Mini-Site Review, Project Status," UCLA: Rockwell Science Center, Feb. 23, 1998, pp. 1-58.

Pottie, "Hierarchical Information Processing in Distributed Sensor Networks," ISIT, Aug. 16-21, 1998, IEEE, 1998, pp. 163.

Pottie, "R&D Quarterly and Annual Status Report," SPAWAR (contractor), Apr. 31, 1999.

Pottie, "Wireless Sensor Networks," ITW 1998, Jun. 22-26, 1998, available at http://dantzig.ee.ucla.edu/oclab/Pottie.html, 2 pages.

Rabaey et al., "PicoRadio Support Ad Hoc Ultra-Low Power Wireless Networking," Computer, IEEE, Jul. 2000, pp. 42-48.

Radlherr, "Datentransfer Ohne Draht and Telefon," Funkschau, Nov. 1991, pp. 49-52.

Raji, "Control Networks and the Internet, Rev. 2.0," Echelon Corp., 1998, pp. 1-39.

Raji, "End-to-End Solutions with LonWorks® Control Technology: Any Point, Any Time, Any Where," Echelon Corp.;, 1998, pp. 1-30.

Raji, "Control Networks and the Internet," Echelon Corp., Rev. 2.0, available at http://www.echelon.com/solutions/opensystems/papers/Control_Internet.pdf (1998).

Rants and Ramblings, "Go Wireless . . . At a Payphone," May 10, 2003, http://www.morethanthis.net/blog/archives/2003/05/10/000301.html (2 pages).

Custom Solutions, Inc., HomeVision-PC Version 2.62, Owner's Manual (1997), pp. 1-234.

Custom Solutions, Inc., Media Information, Feb. 16, 1999, available at http://web.archive.org/web/19990502073249/www.csi3.com/hv_media.htm on Feb. 27, 2009, pp. 1-2.

Custom Solutions, Inc., Using Enerzone StatNet Thermostats with HomeVision (1998) pp. 1-16.

Davies et al., "Internetworking in the Military Environment," Proceedings of IEEE Infocom '82 (1982) pp. 19-29.

Davies et al., "The Application of Packet Switching Techniques to Combat Net Radio," Proceedings of the IEEE, vol. 75, No. 1, Jan. 1987, pp. 43-55.

Davis et al., "Knowledge-Based Management of Cellular Clone Fraud," IEEE (1992), pp. 230-234.

Deering et al., "Internet Protocol, Version 6 (IPv6)," RFC1883, Publisher: unknown, Dec. 1995, pp. 1-37.

Deering et al., "Internet Protocol, Version 6 (IPv6)," RFC2460, The Internet Society, Dec. 1998, pp. 1-39.

Diaz, "Intervehicular Information System (IVIS): the Basis for a Tactical Information System," SAE International, Mar. 1994, pp. 1-14.

Dixon et al., "Addressing, Bridging and Source Routing," IEEE Network, Jan. 1988, vol. 2, No. 1, pp. 25-32.

Dong et al., "Low Power Signal Processing Architectures for Network Microsensors," ACM 1997, pp. 173-177.

Echelon Corp., "LonTalk® Protocol Specification," Doc. No. 19550, available at http://ww w.enerlon.com/JobAids/Lontalk%20Protocol%20Spec.pdf (1994).

Echelon Corp., "Series 90™-30 PLC LonWorks® Bus Interface Module User's Manual," Doc. No. GFK-1322A, available at http://www.pdfsupply.com/pdfs/gfk1322a.pdf (1997).

Elson et al., "Fine-Grained Network Time Synchronization Using Reference Broadcasts," UCLA Computer Science Department, May 17, 2002, pp. 1-14.

Eng et al., "BAHAMA: A Broadband Ad-Hoc Wireless ATM Local-Area Network," 1995 IEEE International Conference on Communications, Jun. 18-22, 1995, pp. 1216-1223.

Ephremides et al., "A Design Concept for Reliable Mobile Radio Networks with a Frequency Hopping Signaling," IEEE 1987, pp. 1-18.

ESTeem Application Paper—AgriNorthwest Employee's Provide Wireless Control System (describing a system that was in use prior to Mar. 1999).

ESTeem Application Paper—Allen-Bradley Goes Wireless on Alaska's North Slope (describing a system that was in use prior to Mar. 1999).

ESTeem Application Paper—Build Your Own Wireless Power Distribution System (describing a system that was in use prior to Mar. 1999).

ESTeem Application Paper—Lost Cabin Gas Plant Uses Wireless Control to Enhance Production & Safety (describing a system that was in use prior to Mar. 1999).

ESTeem Application Paper—Northwest Farm Applies Wireless Solution (describing a system that was in use prior to Mar. 1999).

ESTeem Application Paper—Wireless Control of Polluted Water (describing a system that was in use prior to Mar. 1999).

ESTeem Application Paper—Wireless Mobile Mapping System (describing a system that was in use prior to Mar. 1999).

ESTeem Application Paper—Wireless Networking for Kodiak's Coast Guard Station (describing a system that was in use prior to Mar. 1999).

ESTeem Application Paper—Wireless Networking for Natural Gas Extraction (describing a system that was in use prior to Mar. 1999).

ESTeem Models 85, 95, 96, & 98 User's Manual (describing the ESTeem 96C and 96F radios used prior to 1999).

Estrin et al., "Next Century Challenges: Scallable Coordination in Sensor Networks," ACM, 1999, pp. 263-270.

Estrin et al., "RFC1940—Source Demand Routing: Packet Format and Forwarding Specification (Version 1)," Network Working Group, May 1996, available at http://www.faqs.org/rfcs/rfc1940.html, Sep. 14, 2009, pp. 1-20.

Estrin et al., "Source Demand Routing: Packet Format and Forwarding Specification (Version 1)", Network Working Group, Internet Draft, Jan. 19, 1995, pp. 1-28.

Federal Communications Commission, "Notice of Proposed Rule Making and Order," Adopted Dec. 17, 2003, Released Dec. 30, 2003 (54 pages).

Frank, "Transmission of IP Datagrams Over NET/ROM Networks, ARRL Amateur Radio 7th Computer Networking Conference," Oct. 1988, pp. 65-70.

Frank, "Understanding Smart Sensors," Artech House (1996).

Frankel, "Packet Radios Provide Link for Distributed Survivable Command Control Communications in Post-Attack Scenarios," Microwave System News, Jun. 1983, Circle Reader Service No. 77, pp. 80-108.

Franz, "HiperLAN—Der ETSI—Standard fur locale Funknetze," NTZ, Sep. 1995, 10 pages.

Gale et al., "The Impact of Optical Media on Information Publishing," Bulletin of the American Society for Information Science, vol. 12, No. 6, Aug./Sep. 1986, pp. 12-14.

Garbee, "Thoughts on the Issues of Address Resolution and Routing in Amateur Packet Radio TCP/IP Networks," ARRL Amateur Radio 6th Computer Networking Conference, Aug. 1987, p. 56-58.

Garcia-Luna-Aceves, "A Fail-Safe Routing Algorithm for Multishop Packet-Radio Networks," IEEE Infocom '86, Technical Sessions: Apr. 8-10, 1986, pp. 434-442.

Garcia-Luna-Aceves, "A Minimum-hop Routing Algorithm Based on Distributed Information," Elsevier Science Publishers, B.V. (North Holland), 1989, pp. 367-382.

Garcia-Luna-Aceves, "Routing Management in Very Large Scale Networks," Elsevier Science Publishers, B.V. (North Holland), 1988, pp. 81-93.

GE Security, "NetworkX NX-4," 2004, pp. 1-2.

GE Security, "NetworkX NX-548E," 2006, pp. 1-2.

Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.

Gerla et al., "Multicluster, Mobile, Multimedia Radio Network," UCLA Computer Science Department; Baltzer Journals; Wireless Networks; Jul. 12, 1995, pp. 255-265.

Golden Power Manufacturing, "6030 PCT Programmable Communicating Thermostat," Author: unknown, 2007, pp. 1-3.

Golden Power Manufacturing, "Ritetemp Universal Wireless Thermostat," Author: unknown, 2007, pp. 1-2.

Goldman et al., "Impact of Information and Communications Technologies on Residential Customer Energy Services," Paper, Berkeley: UCLA, Oct. 1996, pp. 1-89.

Gower et al., "Congestion Control Using Pacing in a Packet Radio Network", Rockwell International, Collins Communications Systems Division, Richardson, TX, IEEE 1982, pp. 23.1-1-23.1-6, 1982.

Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.

Guardian Alarms, Inc., "Security Company—Home Alarm System Monitoring—AES 7067 IntelliTap-II Digital Dialer Interface," Author: unknown, available at www.guardianalarms.net, 2007, pp. 1.

Guardian Alarms, Inc., "Security System—Alarm System Monitoring—7160 EZ Router," Author: unknown, available at www.guardianalarms.net, 2007, pp. 1.

Guardian Alarms, Inc., "Security System—Alarm System Monitoring—Net 7000," Author: unknown, available at www.guardianalarms.net, 2007, pp. 1.

Guardian Alarms, Inc., "Security System—Alarm System Monitoring—Radionics FDX," Author: unknown, available at www.guardianalarms.net, 2007, pp. 1.

AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.

AES IntelliNet Model 7050-E Radio Subscriber Unit Installation Manual, AES IntelliNet, Author: unknown, Jul. 17, 2000, available at www.guardianalarms.net, pp. 1-4.

AES IntelliNet Model 7440 & 7440-XL RF Subscriber Unit, Addendum, AES IntelliNet, Author: unknown, Aug. 29, 2002.

AES IntelliNet Net 77 Version 1.48.30, Installation & Operation Manual, Document 40-0551u, AES Corporation, Author: unknown, Jun. 1999, pp. 1-30.

AES IntelliNet Net 77 Version 1.48.4, Installation & Operation Manual, Document 40-0551u, AES Corporation, Author: unknown, Nov. 2000, pp. 1-36.

AES IntelliNet Net 7K Version 1.48.4, Installation & Operation Manual, Document 40-0551, AES Corporation, Nov. 2000, pp. 1-36.

AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.

AES IntelliNet Theory of Operation, AES IntelliNet; Author: unknown, Dec. 1996, downloaded from http://www.guardianalarms.net, pp. 1-18.

AES IntelliNet Wireless Network Glossary of Terms, document 40/0551u, AES IntelliNet, Author: unknown, Dec. 96, pp. 1-15.

AES IntelliNotes Universal Serial data Interface/USDI, Bulletin No. 55, AES Corporation, Author: unknown, Apr. 5, 2001, pp. 1-12.

AES IntelliTAP Model 7068, Version 1.08, Installation Guide, AES IntelliNet, Author: unknown, Jun. 15, 2000, pp. 1-11.

AES IntelliTRAK 7555-RT GPS Based Vehicle Tracking Unit, Version 2.0a, AES IntelliNet, Author: unknown, Feb. 20, 2001, pp. 1-16.

AES IntelliTRAK 7555-RT GPS Based Vehicle Tracking Unit, Version 2.12, AES IntelliNet, Author: unknown, Nov. 6, 2002, pp. 1-16.

AES Net7000, Installation & Operation Manual, AES Intellinet, Author: unknown, Nov. 24, 1996, pp. 1-76.

AES Net77 Wireless Network Management Software Installation & Operation ManuCentral Station Manual, Section 3, AES IntelliNet, Author: unknown, Dec. 1996, pp. 1-87.

AES UL/ULC System Configuration, AES Corporation, Author: unknown, May 1, 2003, pp. 1.

Agre et al., "Autoconfigurable Distributed Control Systems," ISADS, Apr. 27, 1995.

Airpath Wireless, Inc., "Hot Spot Hardware," Copyright 2003, http://www.airpath.com/programs/hardward/hardware.htm (vistited Jul. 29, 2003) (2 pages).

AlarmLink, Inc. A Brief History available at http://www.alarmlink.com/Default.aspx?tabid=28, on Mar. 23, 2009, pp. 1.

AlarmLink, Inc. Alarm Over IP Products, available at http://www.alarmlink.com/Default.aspx?tabid=38 on Mar. 24, 2009, pp. 1.

AlarmLink, Inc. Central Stations, availabe at http://www.alarmlink.com/Default.aspx?tabid=35, on Mar. 24, 2009.

AlarmLink, Inc. Home Page, avaliable at http://www.alarmlink.com/ on Mar. 24, 2009, pp. 1.

Alarm Link, Inc., "MeshWorks of Los Angeles," available at http://www.alarmlink.com/Default.aspx?tabid=39 on Mar. 24, 2009, pp. 1.

Alwan et al., "Adaptive Mobile Multimedia Networks," IEEE Personal Communications, Apr. 1996, pp. 34-51.

Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.

Amir, "The Ricochet System Architecture," available at http://www.lariat.org/Berkeley/node2.html, on May 1996, pp. 1-5.

Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.

Asada, "Wireless Integrated Network Sensors (WINS)," UCLA, SPIE vol. 3673, Mar. 1999, pp. 11-18.

Baba et al., "Wireless Medium Access Control Protocol for CAN," 4th Int'l CAN Conf., Berlin, Germany, available at http://www.can-cia.org/fileadmin/cia/files/icc/4/babal.pdf (1997).

Baker et al. "The Architectual Organization of a Mobile Radio Network via a Distributed Algorithm," IEEE, Nov. 1981.

Ball et al., "Reliability of Packet Switching Broadcast Radio Networks," IEEE Transactions on Circuits and Systems, vol. CAS-23, No. 12, Dec. 1976, pp. 806-813.

Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.

Bergstein, "US telco plans WiFi payphone," May 12, 2003, http://www.news.com.au/common/story_page/0,4057,6420676%5E15306,00.html (2 pages).

Bhatnagar et al., "Layer Net: A New Self-Organizing Network Protocol," Department of Electrical Engineering, SUNY, IEEE, 1990.

Black, "Lutron RF Technology, Reliable, First, Forward Thinking," LUTRON Electronics Co. Inc., Aug. 2006, pp. 1-16.

Blaney, "HomeRF™ Working Group, 4th Liason Report," IEEE, 802.11-98/360, Nov. 1998, Slides 1-12.

Brain, "How Motes Work," available at http://computer.howstuffworks.com/mote.htm, on Feb. 25, 2010, pp. 1-2.

Brain, "How Motes Work: Ad hoc Networks," available at http://computer.howstuffw orks.com/mote3.htm on Feb. 25, 2010, pp. 1-3.

Brain, "How Motes Work: The Basic Idea," available at http://computer.howstuff works.com/mote1.htm, on Feb. 25, 2010, pp. 1-2.

Brain, "How Motes Work: Typical Applications," available at http://computer.howstuff works.com/mote2.htm, on Feb. 25, 2010, pp. 1-2.

Brayer, "Implementation and Performance of Survivable Computer Communication with Autonomous Decentralized Control," IEEE Communications Magazine, Jul. 1983, pp. 34-41.

Brownrigg et al., "Development of a Packet-Switching Network for Library Automation," Proceedings of the National Online Meeting Apr. 12-14, 1983, pp. 67-74.

Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.

Brownrigg et al., "Electrons, Electronic Publishing, and Electronic Display," Information Technology and Libraries (Sep. 1985), pp. 201-207.

Brownrigg et al., "Implementing Library Automation Plans in a University Computing Environment, Planning for Computing in Higher Education 5," EDUCOM Series in Computing and Telecommunications in Higher Education, 1980, pp. 215-225.

Brownrigg et al., "Online Catalogues: Through a Glass Darkly," Information Technology and Libraries, Mar. 1983, pp. 104-115.

Brownrigg et al., "Packet Radio for Library Automation," Information Technology and Libraries 3 (Sep. 1984), pp. 229-244.

Brownrigg et al., "Packet Switching and Library Automation: A Management Perspective," Proceedings of the 45th ASIS Annual Meeting Oct. 17-21, 1982, vol. 19, pp. 54-57.

"HAI Omni: Features & Specifications," Home Automation, Inc. (archived web page), 1997.

"Home Telemetry Gateway Specifications Sheet: Connector 2000 Series," Coactive 1998.

"How Does the New Power Company Deliver on the Promise of Energy Reconstructing?" NewPower (press release), Author: unknown, May 31, 2001, pp. 1-6.

"IEEE Standards Board: Project Authorization Request (PAR) Form;" http://grouper.ieee.org/groups/802/11/PARs/par80211bapp.html, Mar. 24, 1998.

"Important Dealer Notification—Honeywell AlarmNet-M Network Alert," Source: unknown, Author: unknown, Apr. 2007, pp. 1.

"inCode Telecom Transforming Payphones into Wi-Fi Hot Spots," Jan. 14, 2003, http://www.pocketpcmag.com/news/incode.asp (2 pages).

"Industrial Communications," Author: unknown, available at http://web.archive.org/web/19990222162354/www.metricom.com/industrial/ on May 10, 2010, pp. 1-3.

"TranstexT® Advanced Energy Management System," Brochure, Author: unknown, Integrated Communication Systems, Inc., 1990, pp. 1-8.

"International Search Report and Written Opinion for International Application No. PCT/US2006/002342," Search Authority European Patent Office, mailed May 31, 2006.

"IOConnect Architecture™," Coactive, 2001, pp. 1-4.

"JC/83RF System: Multiple Facility Management by Radio Network," Johnson Controls, Publication No. 2161, 1983, pp. 1-4.

"Keltron's Home Page with Frames, Index," available at http://web.archive.org/web/19990831161957/http://www.keltroncorp.com, on Mar. 24, 2009, pp. 1.

"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.

"LonTalk Protocol, LonWorks™ Engineering Bulletin," Echelon Corp.; Author:.unknown; Apr. 1993, pp. 1-27.

"LonWorks® Products, 1998, Version A," Echelon Corp.; Author: unknown; 1997, pp. 1-21.

"LonWorks® Router User's Guide," Echelon Corp., Author: unknown; 1995, pp. 1-136.

"LonWorks® SMX™ Transceiver," datasheet, Echelon Corp.; Author: unknown; 1997, pp. 1-18.

"M100 Series Motor Actuator," Author: unknown, Johnson Controls, Inc., Apr. 1993, pp. 1-20.

"M100C Series Actuator with Digital Control Signal Input and R81CAA-2 Interface Board," Installation Bulletin, Johnson Controls, 2000, pp. 1-12.

"Man-Portable Networked Sensor System (1997-)," Author: unknown, available at http://www.spawar.navy.mil/depts/d30/d37/d371/mpnss/mpnss.html on May 20, 2010, pp. 1-4.

"March of the Motes," Author: unknown, New Scientist, vol. 179, issue 2409, Aug. 23, 2003, pp. 1-8.

"Metasys Compatible Products," Author: unknown; Johnson Controls, Inc., 1997 (9 pages).

"Metasys Extended System Architecture, vol. II," Author: unknown, Publisher: unknown, Sep. 1999.

"Metasys N2 System Protocol Specification for Vendors," Author: unknown, Publisher: unknown, Jun. 1996.

"Modicon Interfacing," Author: unknown, Engineering Report, No. 90-022, Revised: Apr. 12, 1996, pp. 1-9.

"Moore Products—Hart Protocol Interfacing," Author: unknown, Engineering Report, No. 94-007, Revised: Mar. 1, 1996, pp. 1-3.

"MTC Teams with Coactive Networks to Deliver an Advanced Energy Communications and Management Solution," Coactive (press release), Author: unknown, Feb. 5, 2001, pp. 1-4.

"Net77 Central Station Manual Section 3," AES Intellinet, Dec. 1996.

"NewPower and Coactive Networks Announce Strategic Alliance to Deliver the Connected Home," Coactive (press release), Author: unknown, Mar. 14, 2001, pp. 1-4.

"NX-480 Wireless Motion Sensor, document No. 466-1479 Rev. D," Caddx Controls, May 1, 1998.

"Omni Installation Manual," Author: unknown; Home Automation, Inc., Oct. 1997, pp. 1-88.

"Omron Interfacing," Author: unknown, Engineering Report, No. 95-003, Revised: Apr. 17, 1996, pp. 1-4.

"Opto-22 Protocol," Author: unknown, Engineering Report, No. 93-010, Revised: May 31, 1996, pp. 1-8.

"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.

"Phoenix Contact Interfacing, Author: unknown," Engineering Report, No. 94-001, Revised: Jun. 20, 1996, pp. 1-7.

"Phonelin / HPNA / HomePNA Networks," http://www.homenethelp.com/web/howto/HomeNet-HPNA.asp (visited Jul. 29, 2003) (3 pages).

"PLC Direct (Koyo) Interfacing, Author: unknown," Engineering Report, No. 96-001, Revised: Apr. 10, 1996, pp. 1-8.

"Power/Perfect Energy Management Systems," Author: unknown, Johnson Controls, 1983, pp. 1-4.

"Selected Vendor Telecommunications Products," available at http://eetd.lbl.gov/ea/ems/reports/39015a.pdf (describing public uses in 1995), pp. 1-83.

"Smart Home Technology Leader Intelli Selects Coactive Networks Internet Gateways," Coactive (press release), Author: unknown, Sep. 11, 2000, pp. 1-4.

"Special Poll Feature," Author: unknown, Engineering Report, No. 93-008, Sep. 1993, pp. 1-5.

"Square D Interfacing," Author: unknown, Engineering Report, No. 88-010, Revised: Apr. 18, 1996, pp. 1-9.

"Technology Review, Metricom's Ricochet Packet Radio Network," Ham Radio Online, 1996, Author: unknown, pp. 1-3.

"Texas Instruments Interface," Author: unknown, Engineering Report, No. 91-021, Revised: Nov. 1994, pp. 1-3.

"The New Power Company Announces Revolutionary Energy-Saving Program the Gives Consumers Remote Control of the Their Thermostats via the Internet," NewPower (press release), Author: unknown, Apr. 24, 2001.

"The SNVT Master List and Programmer's Guide," Echelon Corp., Author: unknown, Mar. 1996, pp. 1-23.

To Starbucks and beyond: 802.11 wireless Internet access takes off, CommunicationsSolutions.com, vol. 4, Issue 1, Q1 2003, pp. 8-9.

"Toshiba Interfacing," Author: unknown, Engineering Report, No. 91-011, Revised: Jun. 19, 1996, pp. 1-4.

Reexamination Control No. 90-008011 Non-Final Office Action dated Nov. 19, 2007.

Reexamination Control No. 90-008011 Final Office Action dated Aug. 13, 2008.

Reexamination Control No. 90-010301 Non-Final Office Action dated Dec. 2, 2009.

Reexamination Control No. 90-010505 Non-Final Office Action dated Mar. 3, 2010.

Reexamination Control No. 90-010507 Non-Final Office Action dated Mar. 3, 2010.

Reexamination Control No. 90-010508 Non-Final Ofice Action dated Mar. 3, 2010.

Reexamination Control No. 90-010509 Non-Final Office Action dated Mar. 3, 2010.

Reexamination Control No. 90-010505 Final Office Action dated Aug. 2, 2010.

Reexamination Control No. 90-010507 Final Office Action dated Aug. 2, 2010.

Reexamination Control No. 90-010508 Final Office Action dated Aug. 2, 2010.

Reexamination Control No. 90-010509 Final Office Action dated Aug. 2, 2010.

Reexamination Control No. 90-010510 Final Office Action dated Aug. 20, 2010.

Reexamination Control No. 90-010511 Final Office Action dated Aug. 20, 2010.

Reexamination Control No. 90-010512 Final Office Action dated Aug. 20, 2010.

Reexamination Control No. 90-010301 Final Office Action dated Nov. 5, 2010.

Reexamination Control No. 90-010510 Final Office Action dated Nov. 5, 2010.

Reexamination Control No. 90-010511 Final Office Action dated Nov. 5, 2010.

Reexamination Control No. 90-010512 Final Office Action dated Nov. 5, 2010.

Reexamination Control No. 90-010510 Non-Final Office Action dated Dec. 2, 2009.

Reexamination Control No. 90-010511 Non-Final Office Action dated Dec. 2, 2009.

Reexamination Control No. 90-010512 Non-Final Office Action dated Dec. 2, 2009.

Reexamination Control No. 90-010301 Notice of Intent to Issue Reexam Certificate dated Dec. 13, 2010.

"3Com Invests in Coactive Networks," Coactive (press release), Author: unknown, Dec. 14, 1999, pp. 1-4.

"5808 Photoelectric Smoke/Heat Detector with Built0in Wireless Transmitter Installation Instructions," Ademco, 1998.

"ABB Kent-Taylor Interfacing," Author: unknown, Engineering Report, No. 93-011, Jun. 18, 1996, pp. 1-9.

"AES Central Station Installation & Operation Manual, Document No. 40-0551e," AES Intellinet, Nov. 1996.

"Allen-Bradley Interfacing," Author: unknown, Engineering Report, No. 90-023, Jul. 21, 1999, pp. 1-11.

AN/TSQ-129 Position Location Reporting System (PLRS), Author: unknown, available at http://www.fas.org/man/dod-101/sys/land/plrs.htm on Feb. 22, 2010, pp. 1-3.

"Barrington Interface," Author: unknown, Engineering Report, No. 90-013, Revised: Oct. 1994, pp. 1.

Bell Canada launches public wireless Internet hotspot pilot, Dec. 10, 2002, http://www.bell.ca/3n/about/press/release/2002/pr_20021210.asp (3 pages).

"Bristol Babcock Interfacing," Author: unknown, Engineering Report, No. 95-001, Revised: Apr. 17, 1996, pp. 1-4.

"Caddx Installation Instructions Package, document No. 466-1486," Caddx Controls, Aug. 1998.

"Caddx Installation Instructions Package, document No. 466-1786," Caddx Installation Controls, Inc., Caddx Controls; Author: unknown; Aug. 1998, pp. 1-58.

"Case Study: Genentech Uses Coactive's Technology to Centralize Monitor and Control Functions in a Mixed Legacy and New Equipment Environment," Coactive, Author: unknown, 1998, pp. 1-4.

"Case Study: Ingham Regional Medical Center Uses Coactive Technology to Monitor and Control Critical Power Generations in a Multi-Campus Environment," Coactive, 1998, pp. 1-4.

"Central Station Manual Section 1 System Overview, document No. 40-0551," AES Intellinet, Dec. 1996.

"Circon Systems Partners with Coactive Networks to Deliver Circon WebControl™," Coactive (press release), Author: unknown; Feb. 7, 2000, pp. 1-4.

"Circon Technology Connects Building Management Systems to Internet Using Coactive Routers," Coactive (press release), May 20, 1997.

"Cisco's John Chambers Discusses the Internet Consumer Revolution at CES Using Demo Based on Echelon's LonWorks Technology," Home Toys (press release), Jan. 8, 1999.

Coactive Bridges Gap between Control Systems and Corporate Data Networks with New Off-the-Shelf Router Family, Coactive (press release), Jun. 8, 1998.

"Coactive Enhances Residential Gateway to Enable Multiple Home Networks," Coactive (press release), Author: unknown; Jan. 6, 2000, pp. 1-4.

"Coactive Joins 3Com to Demonstrate Convergence of Control and Enterprise Networks at Retail Systems '98," Coactive (press release), Author: unknown, Jun. 16, 1998, pp. 1-4.

"Coactive Launches First Architecture to Support the Convergence Between Contol and IP Networks," Coactive (press release), Author: unknown, May 20, 1998, pp. 1-4.

"Coactive Leads Standardization Effort for LonTalk/IP Routers," Coactive (press release), Author: unknown, May 20, 1997, pp. 3.

"Coactive Networks and Diverse Networks Team to Deliver End-to-End Infrastructure for Enabling the Digital Home," Coactive (press release), Author: unknown, Aug. 28, 2000, pp. 1-4.

"Coactive Networks and Innovex Technologies Deliver Internet Access to Home Security, Lighting and Climate Control," Coactive (press release), Author:.unknown, Feb. 29, 2000, pp. 1-4.

"Coactive Networks and Silicon Energy Partner to Deliever an End-to-End Solution for Internet-Based Energy Monitoring and Analysis," Coactive (press release), Author: unknown, Sep. 19, 2000, pp. 1-4.

"Coactive Networks and Vicinium Systems team to Deliver a Complete Television-Based Interface to Digital Homes and Neighborhoods," Coactive (press release), Author: unknown, Jun. 19, 2000, pp. 1-4.

"Coactive Networks Announces First Shipments of Internet Gateway to Home Control Systems," Coactive (press release), Author: unknown, May 3, 1999, pp. 1-4.

"Coactive Networks Announces Formation of Technical Advisory Board," Coactive. (press release), Author: unknown, Oct. 5, 1998, pp. 1-4.

"Coactive Networks Announces System Provider Partner Program," Coactive (press release), Author: unknown, Jan. 25, 1999, pp. 1-4.

"Coactive Networks Expands Support for Management and HMI Applications," Coactive (press release), Author: unknown, Nov. 2, 1998, pp. 1-4.

"Coactive Networks Names Gus Ezcurra Vice President of Sales," Coactive (press release), Author: unknown, Jul. 20, 1998, pp. 2.

"Coactive Networks Names Janice Roberts, 3Com Senior VP, to Board of Directors," Coactive (press release), Author: unknown, Jun. 2, 1998, pp. 2.

"Coactive Networks Powers Innovative Energy Management Solution," Coactive (press release), Author: unknown, Jan. 5, 2001, pp. 1-4.

"Coactive Networks President Named to LonMark Board of Directors," Coactive (press release), Jun. 14, 1998.

"Coactive Networks Shatters Price Barriers with New IP Gateway to Home Control Systems," Coactive (press release), Author: unknown, Oct. 26, 1998, pp. 1-4.

"Coactive Networks to Supply Internet-Based Home Gateways for up to 400,000 customers; First Phase of Deliveries Valued at US$2 Million," Coactive (press release), Author: unknown, Oct. 25, 1999.

"Coactive Networks Unveils the First Full-Service Residential Gateway," Coactive (press release), Author: unknown, May 3, 2000, pp. 1-4.

"Coactive Receives $2 Million in Funding," Coactive (press release), Oct. 15, 1997.

"Coactive Receives First Round of Venture Funding Investors Embrace Control Network Connectivity Technology," Coactive (press release), Author: unknown, Dec. 1, 1997, pp. 2.

"DSC-3500 Meeting the Control and Conservation Challenge," Johnson Controls, 1984, pp. 1-6.

"DTE Energy Technologies Selects Coactive Networks Internet Gateways to Roll Out New Class of E-Services to Businesses," Coactive (press release), Author: unknown, May 3, 2000, pp. 1-4.

"DTE Energy Technologies Selects Coactive Networks to Power Distributed Generation Solutions Worldwide," Coactive (press release), Author: unknown, Aug. 1, 2001, pp. 1-4.

"Echelon Corporation Demonstrates Internet Connectivity in Digital Home Applications at 1999 International Consumer Electronics Show," Home Toys (press release) , Dec. 15, 1998.

"Eight Leading Controls Companies Join Coactive Partner Program," Coactive (press release), Author: unknown, Aug. 21, 2000, pp. 1-4.

"Enhanced Position Location Reporting System (EPLRS)," Author: unknown, available at http://www.globalsecurity.org/military/systems/ground/eplrs.htm on Feb. 22, 2010, pp. 1-3.

"ESTeem Engineering Report, Johnson Controls Interface No. 91-102," Author: unknown, Publisher: unknown, Nov. 1994, pp. 1-14.

"ESTeem Model 96F," Author: unknown, ESTeem Radios; Sep. 6, 1996, pp. 1-2.

"Foxboro Interfacing," Author: unknown, Engineering Report, No. 91-023, Revised: Jun. 19, 1996, pp. 1-5.

"GE Fanuc Interfacing," Author: unknown, Engineering Report, No. 91-010, Revised: Apr. 11, 1996, pp. 1-8.

"General PLC/RTU Interfacing," Author: unknown, Engineering Report, No. 92-010, Revised: Jun. 18, 1996, pp. 1-5.

Prophet, Graham, Living in a Wireless Wonderland, available at http://www.edmag.com/infoaccess.asp, Jun. 5, 2010, pp. 79-94.

U.S Appl. No. 12/816,266 Non-Final Office Action dated Jun. 15, 2011.

U.S. Appl. No. 12/169,536 Non-Final Office Action dated Jun. 8, 2011.

U.S. Appl. No. 12/169,536 Non-Final Office Action dated Nov. 21, 2011.

U.S. Appl. No. 12/689,220 Final Office Action dated Oct. 5, 2011.

U.S. Appl. No. 12/482,892 Non-Final Office Action dated Jun. 28, 2011.

U.S. Appl. No. 12/482,892 Non-Final Office Action dated Nov. 25, 2011.

Bigioi, "Transparent, Dynamically Configurable RF Network Suitable for Home Automation Applications," 1999.

"Homeserve Detail d'activites", Grizzli Systems, Oct. 11, 1999.

Letter of Alistair Munro (University of Bristol) to Jean-Jacques Ribot (Radian Association) dated Jan. 3, 1999 and attachment titled "Radio Application Network (RADIAN) Protocol Definition Proposal."

* cited by examiner

| Instruction Code | Function |
|---|---|
| 00000001 | Vending machine n is low on product X |
| 00000002 | Vending machine n is out of product X |
| 00000003 | Vending machine n is out of product Y |
| 00000004 | Vending machine n is out of order |
| 00000005 | Vending machine n is tilted |
| ⋮ | ⋮ |
| 00100101 | Person Y is in distress. |
| ⋮ | ⋮ |
| 00111101 | Trash Compactor m is in need of service. |
| ⋮ | ⋮ |
| 10011001 | Gas pump k is low on fuel. |

MULTI-FUNCTION GENERAL PURPOSE TRANSCEIVERS AND DEVICES

CROSS REFERENCE TO RELATED APPLICATIONS & PRIORITY CLAIMS

This patent application is a continuation of U.S. patent application Ser. No. 09/756,386, filed Jan. 8, 2001, now U.S. Pat. No. 7,397,907; which is a continuation of U.S. patent application Ser. No. 09/102,399, filed Jun. 22, 1998, now U.S. Pat. No. 6,233,327; U.S. patent application Ser. No. 09/102,399 is a continuation-in-part of U.S. patent application Ser. Nos.: (a) 08/825,576, filed on Mar. 31, 1997, entitled Transmitter for Accessing Automated Financial Transaction Machines, and issuing as U.S. Pat. No. 7,137,550; (b) 08/895,720, filed Jul. 17, 1997, entitled Transmitter for Accessing Pay-Type Telephones, and issuing as U.S. Pat. No. 5,926,531; and (c) 08/910,980, filed Aug. 7, 1997, entitled Transmitter for Automatically Communicating Information to a Telephone, and now abandoned; which all three of said applications (a)-(c) claimed the benefit of U.S. Provisional Patent Application Ser. No. 60/040,316, filed Feb. 14, 1997, and entitled Card Replacement Transceiver for Use With Automatic Teller Machines. U.S. patent application Ser. No. 09/102,399 further claims the benefit of U.S. Provisional Patent Application Ser. No. 60/059,643, filed Sep. 20, 1997, and entitled System For Requesting Service Of A Vending Machine. All of said above-listed applications are hereby incorporated by reference as is fully set forth herein.

TECHNICAL FIELD

The present invention generally relates to transceivers, and more particularly to a general purpose radio frequency (RF) transceiver having an open-ended architecture that readily adapts it for a wide variety of uses and applications.

BACKGROUND

There are a wide variety of circumstances in which it is desired or desirable to communicate information to a single location. For example, in the banking industry, when a user accesses an automated teller machine (ATM), it may be desirable to communicate the user identifying information (e.g., account and PIN number) to a central location to verify that the PIN number matches the account number. Likewise, if the ATM breaks down, malfunctions, runs out of money, takes in a predetermined amount of money, or for a variety of other reasons, it may be desirable to communicate such information to a centralize location that can respond accordingly (e.g., dispatch a person to repair or otherwise service machine).

In the vending machine industry, it may be desirable to communicate information relating to the product status (e.g., low or out of stock) of a given vending machine to a central location, so that service personnel may be dispatched to replenish the product. In similar fashion, it may be desirable to communicate machine operational status to a centralized location for purposes of dispatching repair or service personnel. Thus, for example, if the vending machine malfunctions, runs out of change, acquires too much currency, or for other reasons, it may be desired to communicate this information to a centralized location One way this type of information has been communicated in the past has been to dispatch personnel to periodically check on such machinery If problems were noted, then the dispatched personnel communicated this information to a central dispatch or service location One shortcoming with this approach, however, is that it is relatively expensive to employ an individual to make these periodic status checks Also, a machine may be disabled or otherwise in need of service for a undesirably lengthy period of time between service checks, before the service condition is noted and reported. Accordingly, it is desired to provide an apparatus that effectively addresses these and other shortcomings of the prior art.

BRIEF SUMMARY

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for communicating information to a predetermined location. In accordance with one aspect of the invention, the system includes a transmitter disposed at a first location and configured to transmit a signal containing an instruction code to a transceiver The instruction code uniquely identifies an instruction to be carried out Preferably, the transmitter transmits a relatively low-power radio-frequency electromagnetic signal. The system further includes a transceiver disposed remotely from the transmitter (but within range of the transmitted signal) and is configured to receive the transmitted signal. The transceiver circuit includes a line interface circuit configured to interface with a telephone line that is part of the public-switched telephone network (PSTN) and initiate a phone call over the telephone line. In this regard, the transceiver further includes a controller configured to control both the reception of the transmitted signal and to control the communication of information over the telephone line. Finally, the system includes a central station remotely located from said transceiver but being in communication with said transceiver via the PSTN. The central station further includes a decoder configured to decode the instruction code.

As will be appreciated, the system summarized above provides an extremely robust and flexible platform for providing general purpose communications to a central location. In this regard, the term "general purpose" may also be referred to as an "open ended" platform that may be readily adapted for a wide variety of uses. The instruction code is a relatively small data value that may be decoded to define a wide variety of functions. For example, an instruction code a single byte (eight bits) in size may define up to two hundred fifty six different functions or instructions Similarly, an instruction code two bytes in size may define over sixty-five thousand ($2^{16}$) functions or instructions.

In operation, the transmitter transmits the instruction code, perhaps along with other information, to a transceiver located remotely, but generally nearby. The transceiver, which will preferably be integrated into a pay-type public telephone (but which can be integrated into virtually any telephone or other device having access to the PSTN), receives the transmitted information including the instruction code, and communicates this information to a predetermined location over the PSTN. In this regard, the transceiver is configured with a controller or other appropriate component to place a call to a predetermined phone number. Once the connection is established, the instruction code may be communicated (as by modem) to the predetermined location. The predetermined location (which may be a central dispatch location) then decodes the instruction code to identify the function or instruction that corresponds to the code, and further initiates an appropriate response.

To illustrate the foregoing summary with a more concrete example, consider a vending machine that is running low on a particular product. A sensor within the vending machine may make this determination and signal the transmitter accordingly. The transmitter then broadcasts a transmission that includes an instruction code that corresponds to the low product alert. The transceiver receives the broadcast transmission and communicates this information to a predetermined phone number. In this respect, the predetermined phone number may also be communicated from the transmitter to the transceiver along with the instruction code. Assuming that the predetermined number corresponds to a central dispatch center, the center answers the phone call placed by the transceiver and receives the instruction code. It then decodes the instruction code to determine that a particular product is low in the vending machine, and it may dispatch an appropriate service person to restock the machine. To this end, the center may be configured to generate an email message to route to an appropriate service person to handle the request.

In accordance with another aspect of the invention, a method is provided for performing an automated service request. In accordance with this aspect of the invention, the method includes the steps of sensing a service condition and notifying a transmitter of the service condition. Then the method transmits an information signal from the transmitter to a remotely-located transceiver, wherein the information signal includes a function code that specifies the service condition. Thereafter, the method places a call from the transceiver to a central station over a phone line comprising a part of the public switched telephone network (PSTN), and communicates at least the function code from the transceiver to the central station. Finally, the method decodes the function code at the central station to identify the service request.

In accordance with a broader aspect of the present invention a multi-function, general purpose transceiver is provided In accordance with this broad aspect of the invention, the transceiver includes a receiver circuit for receiving a signal transmitted from a remotely located transmitter. The transceiver also includes a transmitter that is configured to communicate information over a phone line, comprising a portion of the PSTN Finally, the transceiver includes a controller that is configured acquire information from the receiver circuit, initiate a phone call to a predetermined location, and transmit the acquired information over the PSTN to the called location

BRIEF DESCRIPTION OF FIGURES

The accompanying drawings incorporated in and forming a part of the specification, illustrate several aspects of the present invention, and together with the description serve to explain the principles of the invention. In the drawings:

FIG. 5 is look-up table illustrating the association of instruction codes with there relevant function;

DETAILED DESCRIPTION OF PREFERRED & ALTERNATIVE EMBODIMENTS

Figure 1A:
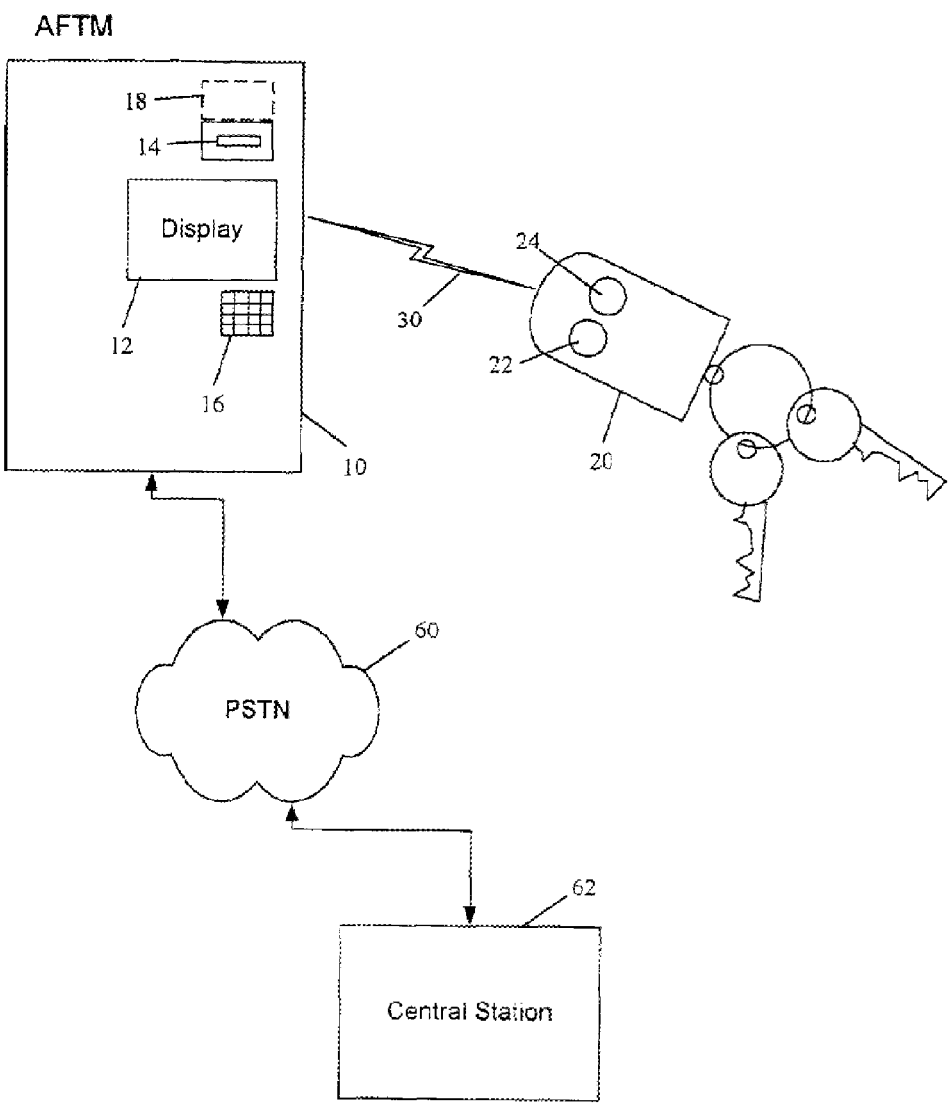
FIGS. 1A and 1B are block diagrams of a system constructed in accordance with one embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
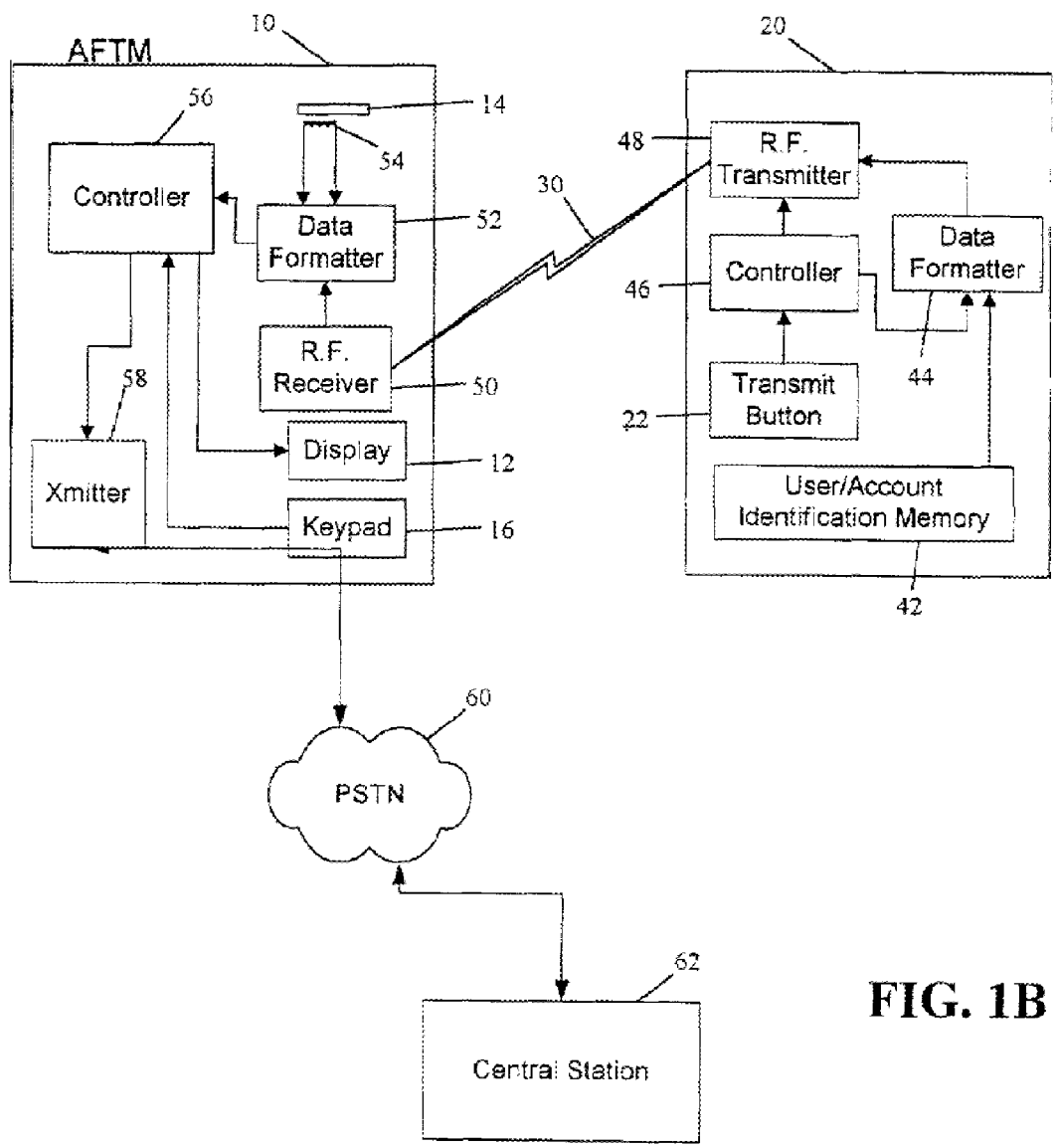
Figure 2A:
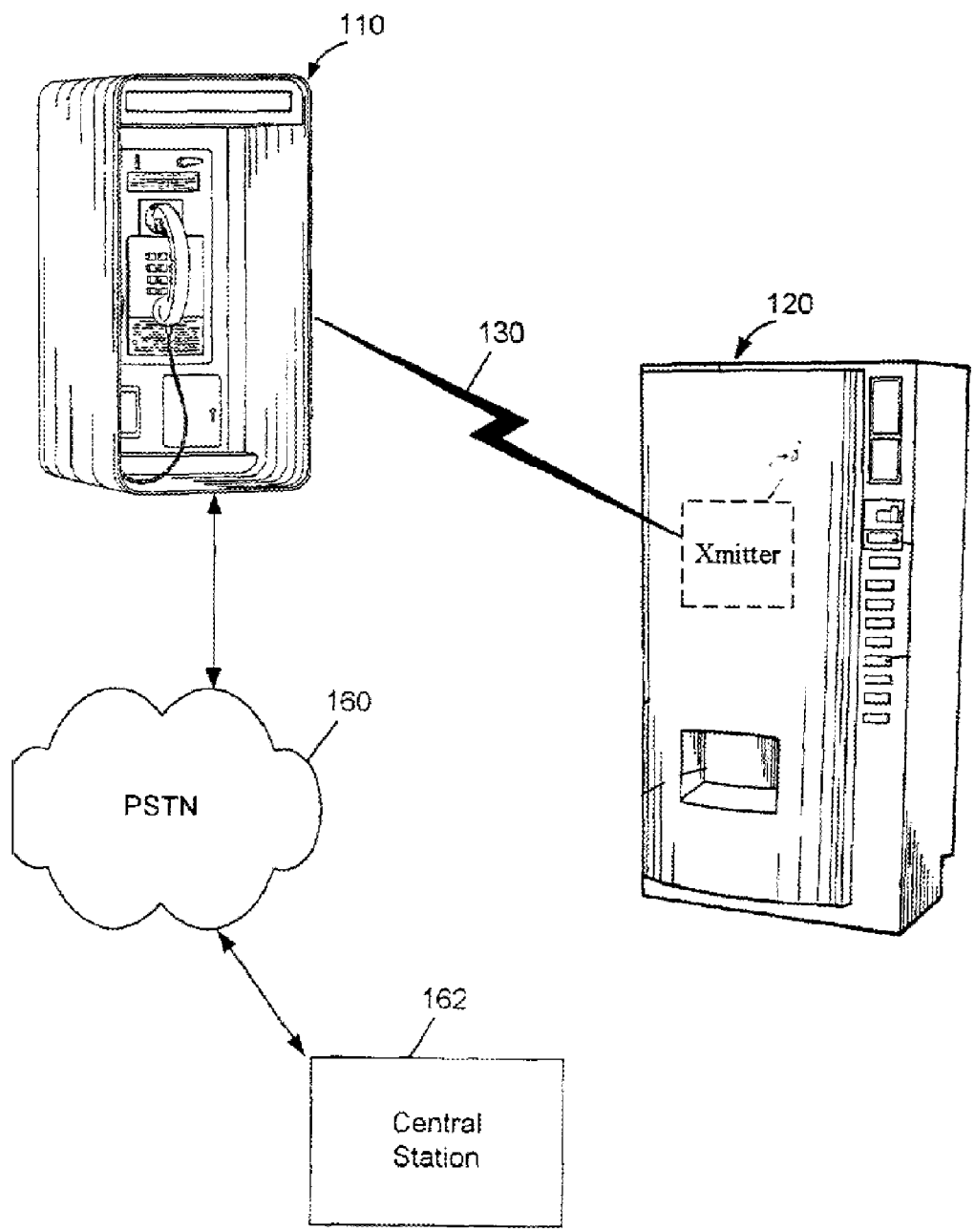
FIGS. 2A and 2B are block diagrams of a system constructed in accordance with an alternative embodiment of the invention.
Figure 2B:
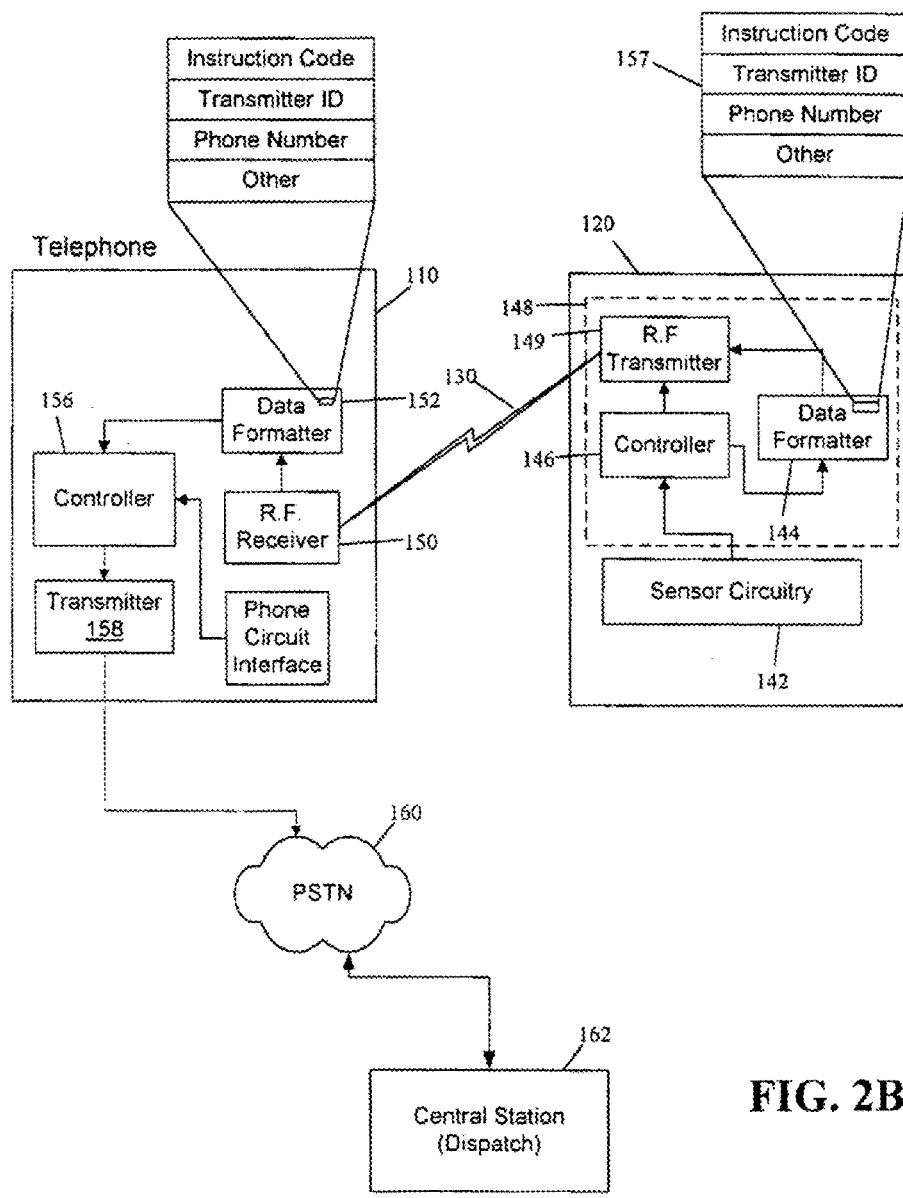

While the present invention is broadly directed to a general purpose transceiver and a method for communicating information from remote sites to a central location, before specifically describing these aspects of the invention, reference will first be made to two different illustrative environments and uses of the present invention In this regard, FIGS. 1A and 1B illustrate an environment in which information may be communicated from financial transaction machines (e.g., ATMs) to a central location, and FIGS. 2A and 2B illustrate an environment in which information may be communicated from vending machines to a central location However, it will be appreciated by persons of skill in the art from a reading of this disclosure that the present invention may have a wide variety of other uses, and a transceiver constructed in accordance with the invention may be utilized in a wide variety of environments.

Turning now to the drawings, FIG. 1 shows a system level block diagram of an automatic financial transaction. More specifically, the figure shows an automatic financial transaction machine (AFTM) 10 being remotely accessed by a transmitter 20. The AFTM 10 may be any of a number of devices, including, most commonly, an automated teller machine for banking. However, the AFTM 10 may further encompass devices such as gas pumps of the type equipped to receive credit cards for charging an otherwise cash transaction. It will be appreciated that other similar devices fall within the scope of the term.

In the embodiment illustrated in FIG. 1A, the AFTM 10 includes a display 12, such as a CRT, for providing a visual display to a user. A card receiving slot 14 is also shown. As is known, the card receiving slot 14 receives a plastic card such as a bank card, credit card, or some other magnetically encoded card for purposes of user identification. A key pad 16 for inputting information, such as a personal identification number (PIN), transaction amounts, and other information is also illustrated in the drawing.

Finally, the last functional block illustrated in the AFTM 10 of FIG. 1A is receiving unit 18 The receiving unit 18 has been illustrated in dashed lines, since it will typically reside inside the AFTM 10 The receiving unit 18 is adapted to receive a signal transmitted from a remote transmitter 20, interpreting that signal in order to allow a user access to the AFTM 10. Preferably, the receiving block 18 comprises a radio frequency (RF) receiving for receiver electromagnetic waves transmitted from an RF transmitter contained with the remote transmitter unit 20. However, consistent with the concepts and teachings in the present invention, the receiving block 18 may be configured to receive other wavelength electromagnetic signals, including ultrasonic or infrared.

A remote transmitting unit 20 is provided for remote communications with the AFTM 10 While the transmitter 20 will be described in more detail below, it broadly operates to transmit an electromagnetic signal 30 to a receiver located at the AFTM 10, wherein said electromagnetic signal is encoded with user identifying information to allow a user to gain access to the AFTM 10. In this regard, an internal transmission circuit (not shown) is provided within the transmitter 20 to act upon command to transmit the encoded electromagnetic signal 30. A transmit button 22 is provided for the user. As illustrated, the transmitter 20 is quite small and may be conveniently attached, for example, to a key ring for ready and portable use. Indeed, in one embodiment, the single transmitter constructed in accordance with the present invention may serve multiple functions For example, small transmitters of this type are known for activating and deactivating automobile alarm systems. The transmitter of the present invention may be integrally designed with such an automobile remote to provide the dual functionality of remotely controlling an automobile alarm along with the functionality of remote access to an AFTM 10. In accordance with such an embodiment, a second transmit button 24 would be provided. In this regard, the first transmit button 22 would be operative to, for example, operate the AFTM 10, while the second transmit button 24 would be operative to remotely operate the automobile alarm. It will be appreciated that the frequency, and/or format of the transmit signal 30 transmitted will be different for the different applications. For example, the signal transmitted to AFTM 10 may include account identification information, while only a unique activation sequence need be transmitted to actuate an automobile alarm.

In yet a further embodiment, additional transmit buttons (not shown) may be provided as well. To illustrate, presently people typically carry multiple banking and/or credit cards in their billfolds or purses. In accordance with one embodiment, a transmitting unit 20 may be provided with multiple transmit buttons, wherein a transmit button 22, 24 is uniquely assigned to a different banking and/or credit card Therefore, if a user has a bank checking account, and credit accounts with other financial institutions for both VISA and MASTERCARD credit cards, then three distinct transmit buttons would be provided for accessing the three different accounts. It should be appreciated that many AFTM's 10 presently allow access to a wide number and variety of accounts, including MASTERCARD, VISA, AMERICAN EXPRESS, etc. Such a machine would be constructed in accordance with the invention to recognize the transmissions from each of the different transmit buttons depressed. In accordance with the description provided below, the various user/account information will be different for each account, and therefore, the signal transmitted will be different. Providing a separate transmit button for each of these functions/account simplifies the user interface. A simpler way to envision such a transmitter 20 is to recognize that each individual credit/banking card that a user may carry in a billfold or purse would be replaced by an additional transmit button on the transmitter 20.

In use, a user would simply depress a transmit button 22, which would result in the transmitter 20 transmitting an electromagnetic signal 30 to a remote AFTM 10 Preferably, the transmitter 20 is an extremely low power transmitter, so that a user will have to be in close proximity, (e.g., several feet) to the receiver 18 of an AFTM 10 in order to use the transmitter. This would help alleviate problems which may otherwise occur if a user approaching an AFTM 10 is circumvented by a second, more distantly located user who depresses his transmit button. This extremely low-power operation also helps to prevent the unlawful interception of the electromagnetic signals In addition, in an alternative embodiment, the transmitted signal may be encrypted for further protect against such unlawful interception A receiving unit 18 disposed within the AFTM 10 receives and decodes the signal 30 The AFTM 10 then evaluates the received, decoded signal to ensure that it identifies a legitimate user/account If so, the user may then access the AFTM 10 In the case of an automatic teller machine, or other similar AFTM 10, a user may then be prompted to enter a personal identification number (PIN) into, for example, key pad 16, as an added measure of security. However, in many AFTM's, a user will not need to make any further input. For example, many gas pumps are presently automated to receive an inserted credit card and debit the corresponding account according to the amount of gasoline purchased. Presently, there is no need in these devices for a user to manually key in a personal identification number. In similar fashion, the system may be configured to operate automatically and exclusively by the depression of a transmit button on the transmitter 20.

Having now presented an overview of the basic operation of the system of FIG. 1A, reference is made to FIG. 1B which shows a more detailed block diagram of the components contained within the AFTM 10 and remote transmitting unit 20 As previously mentioned, the transmitting unit 20 includes a transmit button 22, which initiates the data transmission. The other primary functional blocks of the transmitter 20 include a memory 42, a data formatter 44, a controller 46, and an RF transmitter 48. It will be appreciated that the functional blocks shown in FIG. 1B are shown for purposes of illustration and facilitating a better understanding of the broad concepts of the system. The functional blocks of the illustrated embodiment should not, however, be viewed as specific limitations on the invention. For example, data formatter 44 and controller 46 (discussed below) may be embodied in a single functional unit. Indeed, it is contemplated that the entirety of the circuitry of the transmitter 20 will be contained within a single integrated circuit component In keeping with the description of the transmitter 20, the controller 46 lies at the heart of the transmitter 20, and serves to control the overall functionality thereof. In this regard, the controller 46 is responsive to the depression or actuation of transmit button 22 to begin the data transaction and signal transfer. More particularly, when a user depresses the transmit button 22, the controller 46 initiates the data transmission sequence by accessing an internal memory 42, which, among other things, stores user and/or account identification information. This information is then passed to a data formatter functional block 44 which places the data in an appropriate and predefined format for transmission to the AFTM 10. It is contemplated that the above-described functionality occurs in electronic format. This electronic data is then sent from data formatter 44 to an RF transmitter 48 for conversion from electric to electromagnetic form. As is well known by those skilled in the art, a variety of transducers can perform this functionality adequately.

The AFTM 10 receives the transmitted electromagnetic signal 30 at an RF receiver 50 This receiver serves to convert the data from electromagnetic format into electrical format (e.g., a digital signal) and passes that data to a data formatter 52. Also illustrated as comprising principal functional components of the AFTM 10 are the magnetic card receiving slot 14, a transducer or magnetic pick-up 54, the display 12, the keyboard 16, a block denoted as controller 56, a cloud denoted as miscellaneous 58, and a communication network (e.g., the PSTN) 60

In a manner that is well known, a magnetically encoded card is inserted into slot 14, wherein the information encoded on the card's magnetic strip is read by transducer or magnetic pick-up 54. The electric signals from this pick-up 54 are then formatted into a suitable, preferably digital, form by data formatter 52. For purposes of simplifying the description, the data formatter 52 (shown as a single block) receives signals from both the transducer 54 and the RF receiver 50. It will, however, be appreciated that the data formatting function of block 52 may be provided by two separate and distinct formatting units. In such a retrofit system, the functionality of such data formatter 52 would indeed be performed by distinct physical units.

In keeping with the description of the AFTM 10, the information received and formatted by the data formatter 52 is then transmitted to a block denoted as Controller 56 This functional block serves to verify that the information received, either from the encoded card inserted into slot 14, or the signal received by the RF receiver 50 is valid To do this, the AFTM 10 will generally access a centralized database (not shown) via the PSTN 60 It will be appreciated that this account verification functionality is well known in the prior art, and therefore, need not be discussed herein. Finally, a block 58 denoted as "transmitter" is illustrated within the AFTM 10, which controls the communication of data across the PSTN 60

As will be appreciated by those skilled in the art, the controller 56 performs a variety of functional features which depend, in part, upon the specifics of the machine 10 For example, the block will manage user input and output to and from the display 12 and keypad 16, as well as the PSTN 60 management and access. It would further serve to access any database of information that is stored locally at the AFTM 10.

As illustrated, the ATFM 10 communicates across the PTSN 60 to a central station 62 The central station 62 may comprise a database of financial and/or account information, which database may be utilized to verify user information. It may also include facilities that are capable of dispatching service personnel, if the ATFM 10 sends a message indicating that the machine, or its surrounding environment is in need of service. In this regard, the surrounding environment may refer lighting. As is known, a certain amount of lighting is generally desired (if not required) in the immediate vicinity of an ATM A lighting failure may be an event that is sensed and transmitted by the transceiver to report a service condition for repair. For purposes of the present invention, the actual structure and/or of the central station 62 is unimportant, and thus will not be discussed in detail herein. Suffice it to say that the central station 62 may vary from implementation to implementation.

The controller 56, receiver 50, data formatter 52, and transmitter 58 may all be provided on an open-ended transceiver constructed in accordance with the present invention.

Reference is now made to FIGS. 2A and 2B, which illustrate another environment of the present invention. Specifically, the environment illustrated in these figures is one which provides for the automated service of a vending machine 120. In this regard, a vending machine 120, such as a soda dispensing machine, includes an internal transmitter 148 that communicates information to a nearby transceiver (not shown in FIG. 2A, but illustrated in FIG. 4). In accordance with this illustrated embodiment, the transceiver is incorporated into a public, pay-type telephone 110. However, and as will be appreciated, the transceiver may be incorporated into a variety of devices, so long as it has access to a phone line, preferably one forming a part of the PSTN.

Internally, the transceiver includes receiver circuitry for receiving the transmitted signal 130 and a transmitter for communicating data via the PSTN 160 to a central station 162 In this regard, the central station 162 may be a central dispatch location, that is set up to dispatch service personnel to attend to the vending machine 120. As will be appreciated, the vending machine 120 may encompass a wide variety of devices, in addition to a soda dispensing machine For example, the vending machine 120 may include a snack dispensing apparatus, a candy dispensing apparatus, a cigarette dispensing apparatus, a newspaper dispensing apparatus, an ice dispensing apparatus, among a laundry list of other devices.

A variety of sensors (not shown) may be provided in the vending machine 120 for detecting a variety of events. For example, detecting whether the machine is low on a given product, or out of a product, determining whether the machine is out of change; determining if the machine has taken in a predetermined amount of money, which should be emptied; detecting if the machine is out of order; etc. These, and other events sensed within the vending machine 120 may be communicated to the transmitter 148, which then formats the data in a way that it may be readily understood by the transceiver. The transmitter 148 then transmits the data (via RF link 130) to the transceiver disposed within the telephone 110. This information, in turn, is communicated from the transceiver via PSTN 160 to a central station 162. Based upon the information received, the central station 162 will institute an appropriate response. For example, if the information received is a notification that one or more of the products in the vending machine 120 is either low or out, then a first person may be dispatched to restock the machine If, on the other hand, the information received is a notification that the machine is out of order, then a second person (service person) may be dispatched to service the machine.

Having broadly described the vending machine service environment, reference is now made to FIG. 2B, which illustrates the circuitry within the vending machine 120, as well as the circuitry within the telephone 110, for carrying out the inventive aspects. In this regard, the various sensors disposed within the vending machine are broadly denoted by the block labeled "Sensor Circuitry" 142. The outputs of the various sensors may be directed to a controller 146, which may comprise dedicated circuitry. or may alternatively comprise general purpose programmable hardware, such as a microprocessor or microcontroller. The controller 146, in essence, handles the processing of most of the functional operations carried out at the vending machine 120.

In this regard, and as will be discussed in more detail below, the transceiver of the present invention is characterized by an open-ended architecture that is configured to receive an encoded instruction. This encoded instruction may be decoded to identify specific and unique functions and/or instructions. For example, one code may uniquely describe the event of the vending machine 120 running out of a certain product. Although this code may be meaningless to the transceiver, when decoded by the central station 162, an appropriate action may be taken. Thus, a vending machine company may utilize a given code to define a certain event relevant to the vending machine, while a banking enterprise may utilize the same code to define a completely different event. Nevertheless, the same general purpose transceiver may be used to implement both embodiments.

In keeping with a description of the vending machine 120, the controller 146 is preferably configured to receive sensor outputs and compose the appropriate instruction code for transmission to the transceiver. A block called "Data Formatter" 144 may also be provided within the vending machine 120. As the name implies, this block formats the data for transmission to the transceiver It will be appreciated that, in addition to the instruction code, other information may also be supplied by the transmitter 148. As illustrated by the block 157 (exploded from the Data Formatter block 144), information such as a transmitter identification code, and a destination phone number may also be included in the information transmitted to the transceiver. In this regard, the transmitter identification code uniquely identifies the transmitter, which code may be decoded at the central station to identify the specific vending machine that is originating the message. That is, the instruction code may inform the central station 162 as to the particular service need of the vending machine 120, and the transmitter identification code may inform the central station 162 of the particular vending machine 120, and thus its location, in need of service.

Finally, the data formatter may also include the phone number of the central station 162; namely, phone number that the transceiver is to dial over the PSTN 160. In this way, a generic (open-ended) transceiver may be utilized and installed in mass within public, pay-type telephones, by the service provider. Thus, various companies may then utilize specially configured transmitters 148 to communicate with the general purpose transceiver to communicate a wide variety of information to central locations, defined by the transmitters.

Figure 3:
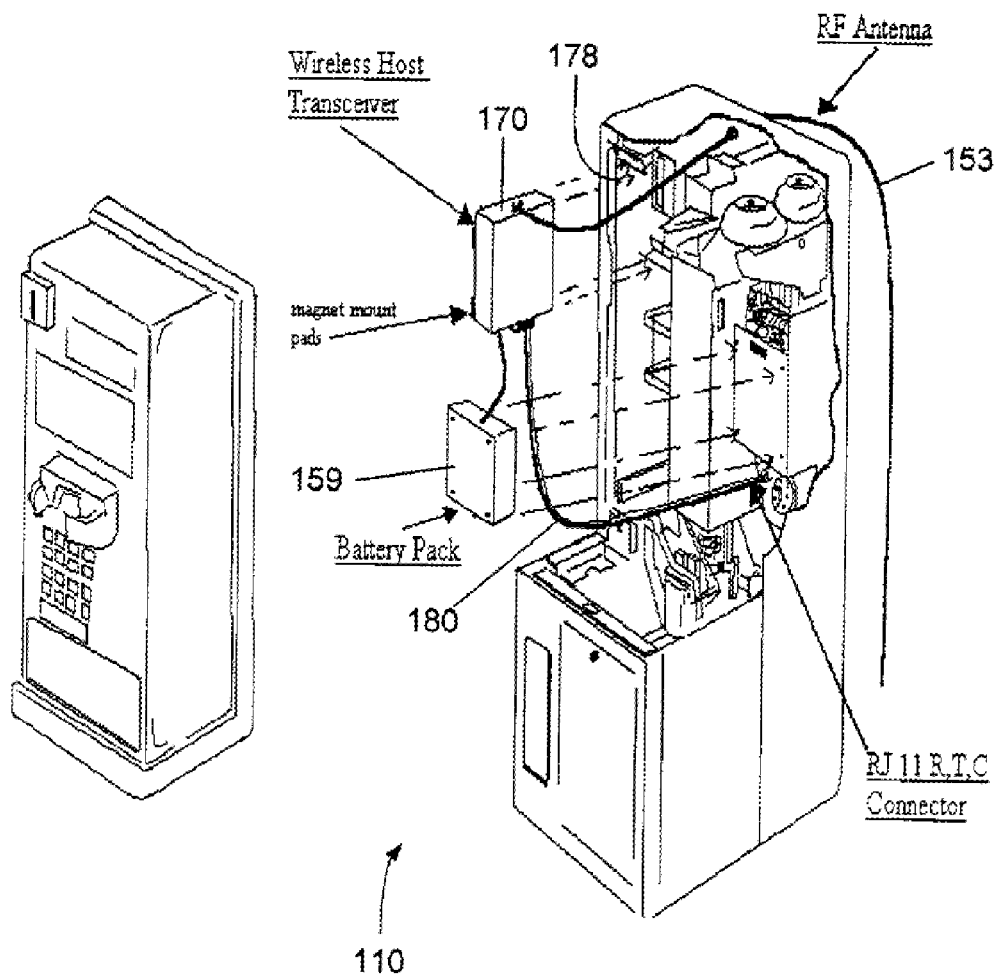
FIG. 3 is an exploded perspective view of a telephone housing a transceiver constructed in accordance with the invention.

FIGS. 1A, 1B, 2A, and 2B illustrate two different environments in which the present invention may operate, it will be appreciated that a variety of other environments may use or implement the invention as well Reference is now made briefly to FIG. 3, which is an exploded perspective view of a telephone 110 incorporating a transceiver 150 constructed in accordance with the present invention In this regard, the transceiver 150 may be provided in a single module having an associated battery pack 151. Alternatively, the transceiver 150 could be designed to operate from the power supplied to the telephone. As illustrated, the module 150 may be configured to snap into a space provided in the telephone, and maintained by a pair or resilient fingers 178.

An external wire 153 may be provided to act as an antenna for the RF receiver. Alternatively, a smaller internal antenna may be provided. As will be appreciated by one of ordinary skill in the art, the output from the transceiver is via cable 180, which may terminate at an RJ11 connector, having Ring, Tip, and Common conductors.

Figure 4:
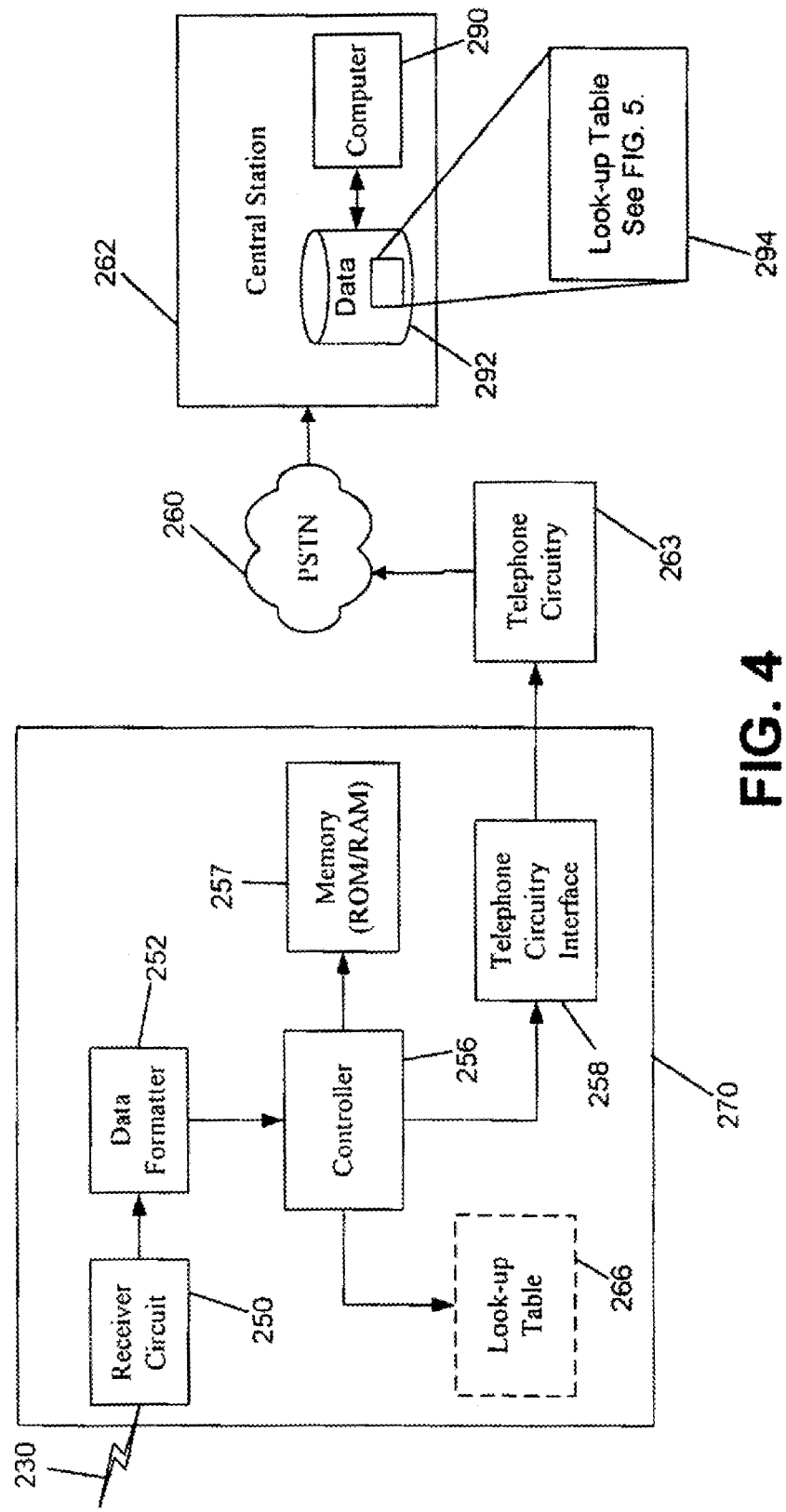
FIG. 4 is a block diagram illustrating a transceiver constructed in accordance with one embodiment of the invention.

Reference is now made to FIG. 4 which illustrates (generically) a system constructed in accordance with the present invention. The drawing more specifically illustrates an open-ended transceiver 270 constructed in accordance with the present invention. In this regard, the transceiver 270 includes a receiver circuit 250 that is configured to receive an electromagnetic signal (e.g., RF, optical, etc.) As described above, this signal includes an instruction code, and possibly other items such as a phone number, a transmitter identification code, etc. A data formatter 252 is provided in connection with a controller 256 to further format a signal that is to be output from the transceiver 270 to the central station 262. In this regard, additional information may be added to the signal that is transmitted to the central station 262.

For example, a transceiver identification code may be added to the signal. Although the central station 262 may decode the transmitter identification code (if provided) to identify, for example, a geographic location of a transmitter, in environments where the transmitter is a mobile (e.g., handheld), a transmitter identification code may be of no use in identifying a geographic location. In such an environment, the addition of a transceiver code will facilitate the identification of the transmitter location (recognizing that the transmitter will be located in the proximity of the transceiver 270).

The controller 256 preferably performs the overall control and synchronization of functional operations within the transceiver 270. In this regard, the controller 256 may be a general purpose microprocessor or microcontroller. If so, memory 257 will be provided to store programmable code for controlling the operation of the controller 256. Circuitry may also be provided for network interface. For example, telephone circuitry 258 may also be provided for interfacing to the telephone circuitry 263 within the telephone 110. The telephone 110 typically has circuitry configured to interface with the local loop of the PSTN 260. The interface 258 within the transceiver 270 is designed to interface with this typical/standard telephone circuitry 263. The specific implementation of the circuitry of block 258 will be appreciated by persons skilled in the art and need not be described in detail herein.

A look-up table 266 is also illustrated in FIG. 4. It is illustrated in dashed line to represent that it may be optionally provided within the transceiver 270. Consistent with the broader concepts of the invention, in certain embodiments, it may be desired to provide a more application specific transceiver 270. In such embodiments, a look-up table 266 may be provided within the transceiver for decoding information such as the instruction code, the transmitter identification code, or any other information that may be transmitted from the transmitter. The specific use of such data will necessarily be application specific and controlled by the controller 256, and need not be described herein.

At the central station 262, a computer 290 may be provided to receive and process data received from the transceiver 270. In this regard a database 292, including a look-up table 294, may be provided. Since the present invention is directed to the transceiver 270, a variety of platforms may actually be implemented at the central station 262. It will be appreciated, however, that with a computer 290 implementation, an extremely flexible and robust operation may be achieved. For example, the response of the central station 262 to various incoming messages may be programmed to vary depending upon the contents of the message.

By way of illustration, suppose in incoming message identifies a particular vending machine that is out of a given product. The computer 290, upon recognizing this condition, may alert the appropriate person that is to restock the machine. To this end, the computer may so notify the person by sending the person an email message. Similarly, suppose the computer recognizes the incoming message as identifying that a particular vending machine is out of order, then the computer 290 may alert a different person that the machine is in need of technical service. In order to identify the contents of the various incoming messages, the central station 262 may employ a look-up table, like that illustrated in FIG. 5

Referring to FIG. 5, a look-up table is illustrated. Although the look-up table 294 may take on a wide variety of forms, the table illustrated in FIG. 5 includes two columns of data. The first column is a listing of the various instruction codes that are transmitted by the transmitter to the transceiver, and forwarded by the transceiver to the central station. The second column contains the specific functions or instructions that correspond to the transmitted/received instruction code.

Thus, by looking up the instruction code within the table 294, the computer 290 at the central station can readily identify the function or instruction that is to be executed. For example, one code may indicate that a particular vending machine "n" is low on a specific product "X". Another code may indicate that a person "Y" is in distress. Yet another code may indicate that an industrial trash compactor "m" is in need of service Thus, in one embodiment, the instruction codes themselves may be encoded to uniquely identify particular machines or persons. More particularly, in the illustrated embodiment, instruction code 00000001 identifies that vending machine "n" is low on product "X". In yet another embodiment, this same code may indicate that a vending machine (generally) is low on a product (generally) Additional codes may be generated at the transmitter and decoded at the central station to provide this more specific information For example, a transmitter identification code may be decoded by the central station to identify the specific vending machine that is low on product Likewise, an additional code, such as a product code, may be generated by the transmitter to identify the specific product that is low. Thus, in such an alternative embodiment, as many as three different look-up tables may be utilized at the central station 292.

Figure 6:
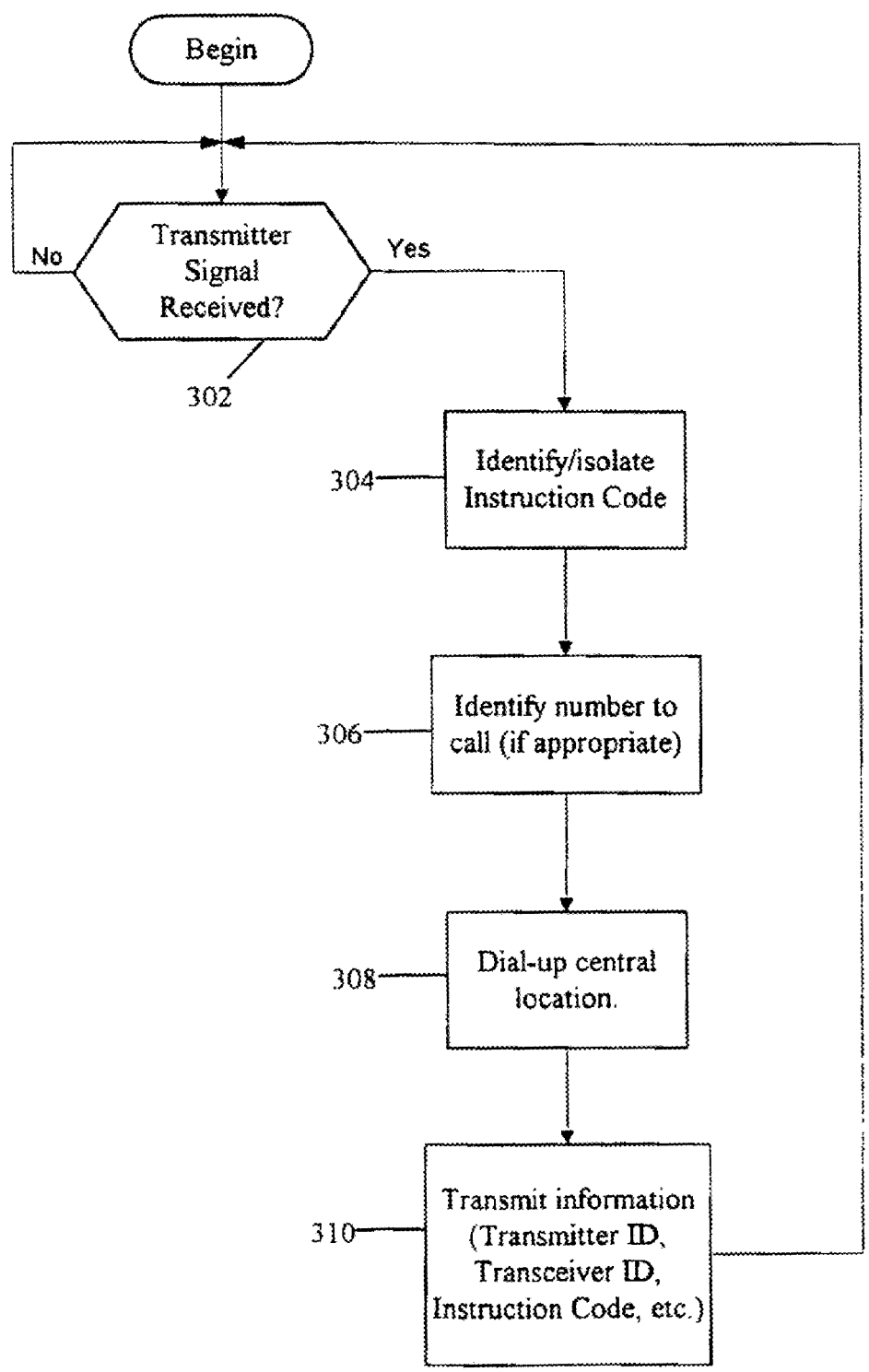
FIG. 6 is a flowchart illustrating the top-level functional operation of a transceiver constructed in accordance with one embodiment of the present invention.

Having described the transceiver of the present invention, and illustrated its use in differing embodiments, reference is now made to FIG. 6, which is a flowchart that depicts top-level functional operation of a transceiver constructed in accordance with one embodiment of the invention. In this regard, the transceiver awaits the receipt of a signal transmitted from a transmitter (302). Upon receipt of a transmitted signal, the transceiver (through the controller and data formatter) looks to identify and/or isolate the instruction code (304). The transceiver also looks, if appropriate, to identify a phone number of a central station (306). The transceiver then dials this central station, establishing a connection over the PSTN (308).

In this regard, the transceiver may be configured to seize the phone line. Thus, anyone making a call or any call currently in progress would be disconnected. Alternatively, the transceiver (through the controller) may be configured to test the phone line for its present availability. If a call is in progress, the controller may store the message received from the transmitter and await the availability of the phone line. Once the phone line becomes available, then the transceiver may assume the line and place its call. In yet a further embodiment, the transceiver may be configured to implement simultaneous voice/data technology to place the phone call to the central station without interrupting any ongoing call. In an even more complex embodiment, a different service may be provided in connection with the telephone 110 through which to place the call. For example, the telephone 110 may also be equipped with an ISDN service or a DSL service, through which the transmitted is communicated. As is known, communication through such a service may be made without any interruption to a call ongoing in the POTS frequency band.

Finally, the transceiver transmits the message, including the instruction code, and, if relevant, the transmitter identification code, the destination phone number, the transceiver identification code, etc. (310).

Figure 7:
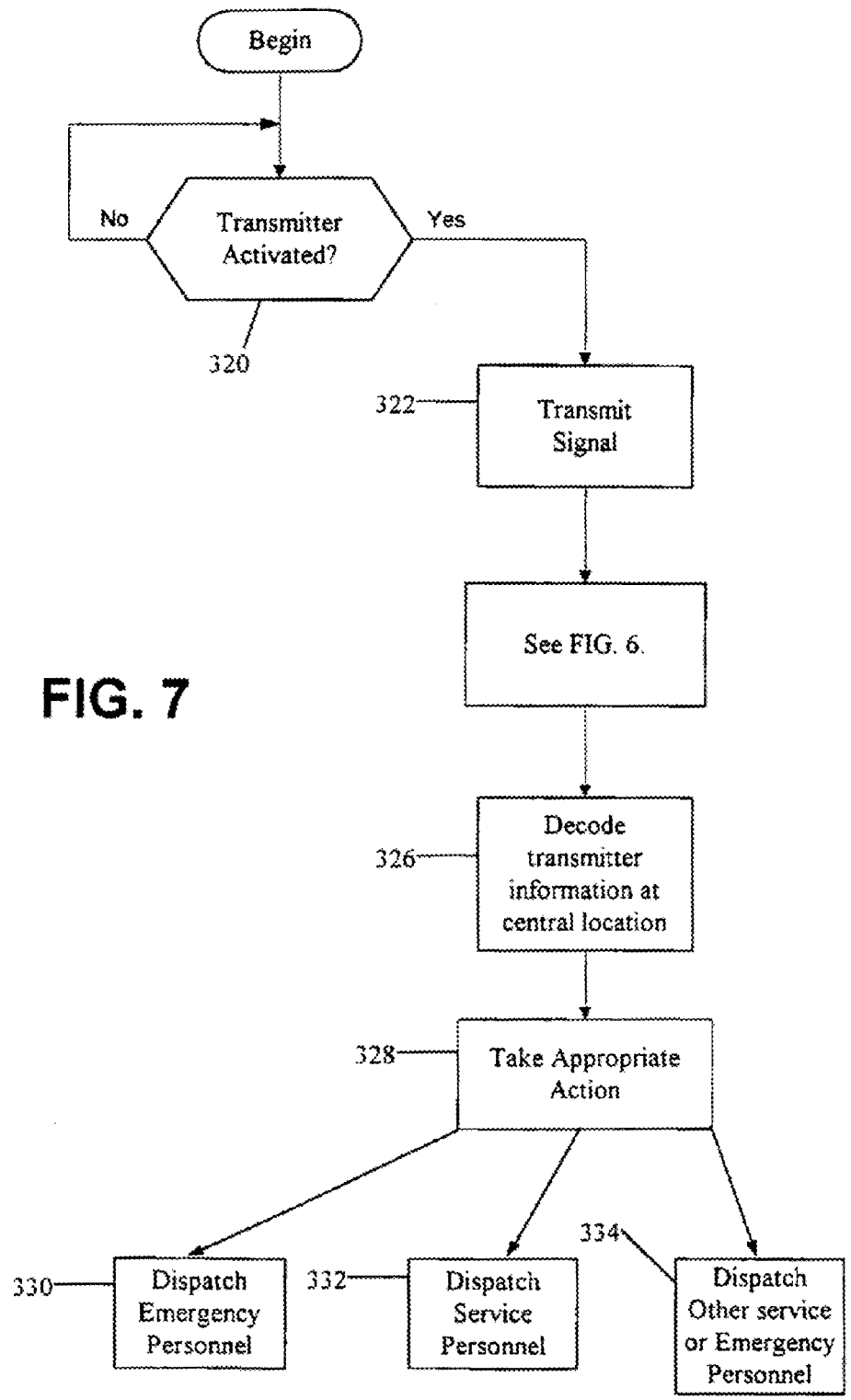
FIG. 7 is a flowchart illustrating the top-level functional operation of a system constructed in accordance with one embodiment of the present invention.

Referring now to FIG. 7, a flowchart is shown that illustrates top-level functional operation of a system, in accordance with one aspect of the invention. In this regard, the system remains in an idle state, until the transmitter becomes activated (320). This activation may result from a user depressing a manual button on a transmitter or by an event triggering an input to a transmitter. Upon activation, the transmitter transmits a signal, including at least an instruction code (322). Thereafter the transceiver operates in accordance with the flowchart of FIG. 6. The central station may then decode information received via the PSTN (specifically decoding the instruction code)

Based upon the decoded instruction code (and perhaps other codes in some embodiments), the central station initiates an appropriate action in response. For example, in response to a distress call, the central station may dispatch emergency personnel (330) In response to a service request, the central station may dispatch service personnel 332. In response to other types of messages or requests, the central station may dispatch other personnel or take other appropriate action (334).

Figure 8:
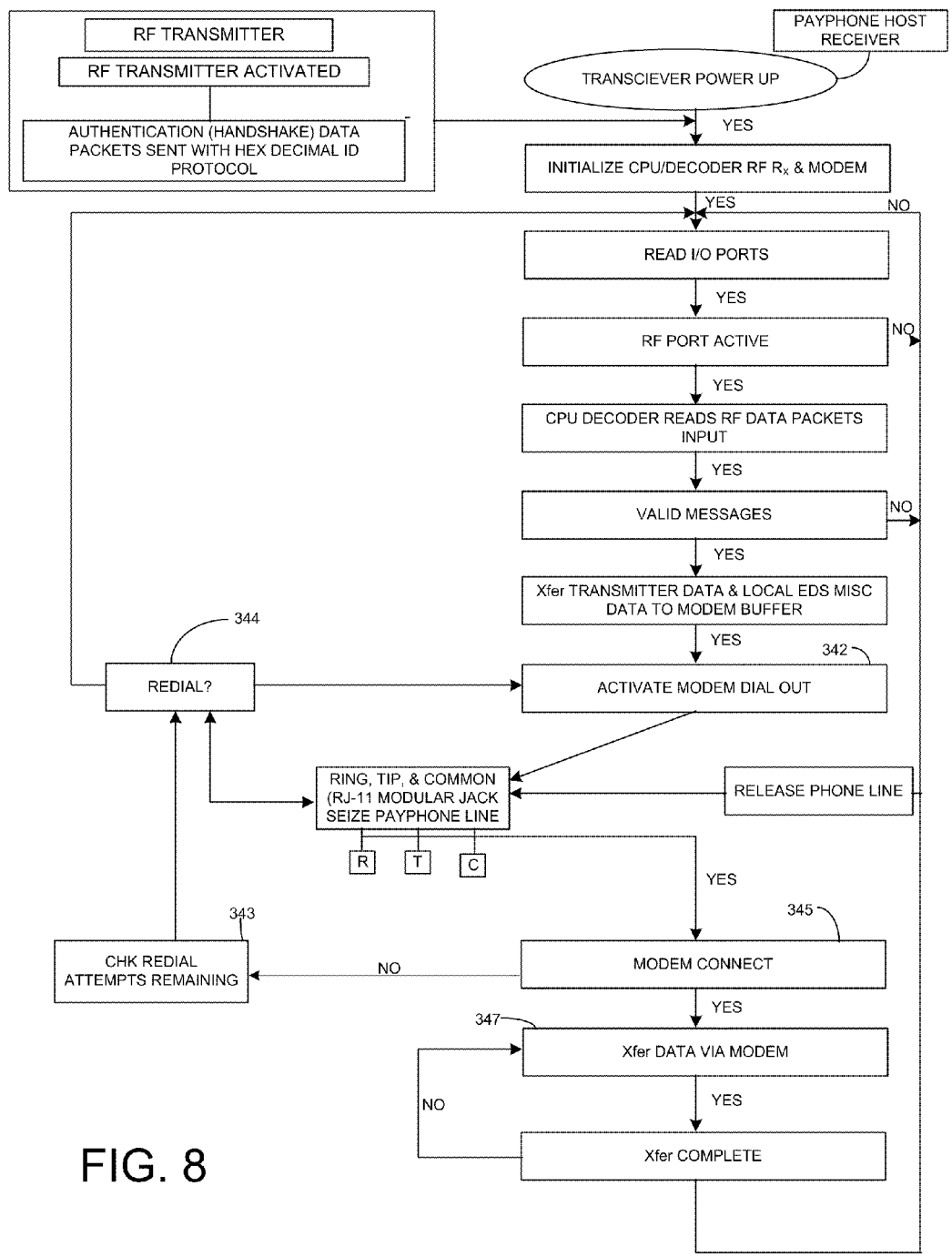
FIG. 8 is a flowchart illustrating a more detailed operation of system constructed in accordance with the present invention.

Having described the top-level functional operation of the invention, reference is made to FIG. 8, which is a flowchart that depicts the operation of the system from more of a hardware level, as opposed to a functional level. The flowchart of FIG. 8 will not be described herein in detail, as a person of ordinary skill in the art will appreciate the system operation simply from a review of the flowchart and the nomenclature provided therein. For example, block 342 indicates the activation of the modem within the transceiver to dial-out onto the PSTN. The decision block 345 evaluates whether an appropriate connection has been established. If so the system proceeds to block 347 to transfer data. Alternatively, the system returns to block 343 and 344 to attempt a redial.

It should be appreciated that the foregoing description has been presented for purposes of illustration and description. Various alternative embodiments may be implemented completely consistent with the concepts and teachings of the invention. Indeed, the encoded message transmitter 148 is, preferably, different that that described above. In this regard, the message preferably transmitted is, in its most basic form, a fourteen byte message, defined by Table 1.

TABLE 1

| Byte | Description |
| --- | --- |
| 1-4 | "To" Address - Four Hex Bites |
| 5-8 | "From" Address - Four Hex Bytes |
| 9 | Message Number |
| 10-11 | Packet Number |
| 12 | Byte Count (14-255) |
| 13 | Command (instruction code) |
| 14 | Data |
| 15 | Check Sum - Hex (modulo 8) |

Thus, in a preferred embodiment, the message may transmitted to define a destination of the central station by the "To" address, which is a logical IP address. Thus, the transceiver may be configured to establish a connection with a predetermined remote number, which may this allow message routing in accordance with the IP protocol, using the Internet In this regard, bytes 1-4 of the message define the destination to which the message is routed.

When the central station receives the message, it may evaluate the "From" address, which will be unique to a given transmitter. This address, in turn defines the physical (e.g., geographic) location of the transmitter. That is, in many embodiments, knowing that a given transmitter was installed in a given device allows the central station 262 to known the location of the transmitter 148.

Byte 13 defines the command or instruction code that is relayed to the central station In accordance with the general purpose nature of the system, a second byte (actually variable in size), permits the passage of data if necessary. For example, byte 13 may be encoded to indicate that a given product in a vending machine is low on stock. Further detail, such as a description of the product, may be passed in byte 14. In an alternative embodiment, this byte may be used to communicate other data. For example, in an embodiment where the transmitter is a hand-held transmitter, a panic button may be provided. The instruction code may be encoded to convey "help" or distress command (See, for example, U.S. Pat. No. 5,714,931, assigned to the assignee of the present invention, and is hereby incorporated by reference). The data field of byte 14 may be encoded to include personal data about the person carrying the transmitter In a banking environment, the instruction code may be one that requests access to an account, while the data field may convey the track one data, typically carried on the magnetic strip of a magnetic card.

In yet another embodiment, a transmitter may be provided on an automobile. Sensors may be disposed in numerous locations throughout the car. In this regard an automobile manufacturer may include a variety of diagnostic sensors covering a variety of the mechanical and electrical systems on the automobile If a system malfunctions, causing the car to break down, the transmitter may encode the relevant data into the data field of the transmitted message In this regard, the instruction code may be that the car is broken down and the data may be the data relevant to diagnose the reason for the breakdown Using this diagnostic information, a service person may be dispatched to the site of the vehicle with the necessary component(s) to service the vehicle, rather than simply dispatching a tow-truck to tow the vehicle to a service location (depending of course on the nature of the service required).

In embodiments such as a personal transmitter, an automotive transmitter, and other embodiments where the nature of the transmitter is necessarily mobile, the transmitter may also include global positioning system (GPS) circuitry. Thus, when the message is transmitted, the data field may also include the relevant GPS location, so that the geographic location of the transmitter may be readily identified and located.

In this regard, byte 14 is actually variable in length. It may vary from 0 to 241 bytes in length. To this end, byte 12 (byte count) will specify the size of the message, which in turn defines the number of bytes in the data field of the message. In the unlikely event that even more information is desired to be transmitted, the protocol defined in Table 1 allows for ready expandability In this regard bytes 9-11 define a message number and a packet number. Up to 255 messages can be sent in a burst transmission, and up to 65,536 packets may be strung together. In this way, the central station, upon receiving multiple burst transmissions may use the message number and packet number to reconstruct a relatively lengthy message transmission that is broken up over an number of successive transmissions.

Although it is preferred to implement the present invention through an open-ended transmission protocol, as defined above, it will be appreciated that the concepts and teachings of the present invention are not so limited. In fact, for purposes of the present invention, the message transmitted by the transmitter may be as simple as an instruction code that defines some condition, that a central station may decode and act upon. In such an embodiment, the transceiver may be specially configured to establish a phone connection with a predetermined central station.

In yet another embodiment, the transmitter may encode a message that transmits both an instruction code and a phone number that the transceiver is to establish a connection with.

Such an embodiment, allows a generic transceiver to be utilized, such that multiple enterprises may utilize this common, generic transceiver for various applications Consistent with these broad concepts, a variety of other configurations may be employed as well.

Indeed, the foregoing description has been presented for purposes of illustration and description. It is not intended to be exhaustive or to limit the invention to the precise forms disclosed. Obvious modifications or variations are possible in light of the above teachings. For example, the transceiver has been illustrated herein having a transmitter configured to communicate across the PSTN. However, it will be appreciated that the transmitter may, consistent with the concepts and teachings of the present invention, be similarly configured to communicate via cellular technology as well. For example, in embodiments such as the automobile embodiment described above, it may be desirable to use a cellular transmitter, instead of a low-power RF transmitter This may be desired because the automobile may break down a relatively significant distance from the nearest pay-type telephone (e.g., location of the nearest transceiver). Thus, a transmitter in the automobile may establish a cellular communication link to a predetermined telephone number and convey the information in a similar message structure.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

I claim:

1. A device for communicating information, the device comprising:
    a low-power transceiver module that is configured to wirelessly transmit a signal comprising an instruction data frame for delivery to a network of addressable low power transceivers wherein at least one low power transceiver has a communication link with a central location;
    an interface circuit configured to establish a communication link with the central location based on an address included in the signal, the communication link comprising one or more low-power transceivers; and
    a controller configured to receive one or more low power RF signals and communicate information contained within the signals to a central location along with a unique transceiver identification number over the communication link.

2. The device of claim 1, the low power signal comprising a logical IP address such that the transceiver can route the information to a destination based on the logical IP address.

3. The device of claim 1, wherein at least one of the controller and transceiver is further configured to communicate a transceiver identification code to the central location.

4. The device of claim 1, wherein transmitted and received signals further comprise a message identification field; a packet identification field; a network field, and a data field.

5. The device of claim 1, wherein transmitted and received signals further comprise a field configured to indicate a destination device for a subsequent transmission path to follow.

6. The device of claim 1, wherein the controller is configured on an integrated circuit and further configured to decode the instruction code and implement an associated instruction that corresponds to at least one of a product code or user account or application information.

7. A wireless communication method for relaying electronic messages in a wireless communication network comprising a plurality of wireless communication devices, the method comprising:
   wirelessly receiving an information signal at a first wireless communication device, the information signal comprising a unique message code and an instruction code;
   decoding the information signal to access the unique message code and the instruction code;
   initiating communication with a second wireless communication device in the wireless communication network in response to the unique message code and the instruction code; and
   communicating the unique message code from the first wireless communication device to the second communication device.

8. The method of claim 7, further comprises communicating a transceiver identification code from the first wireless communication device to the second wireless communication device in addition to a transmitter identification code that corresponds to a low-power transmitter.

9. The method of claim 8 further comprising decoding the transceiver identification code.

10. The method of claim 8, further comprising evaluating the transceiver identification code; and determining a geographical location of the first wireless communication device.

11. The method of claim 8, further comprising checking a received wireless signal for errors.

12. In a wireless communication system comprising at least one wireless communication device capable of communicating to at least one other communication device in a wireless communication network comprising a plurality of wireless communication devices, the at least one wireless communication device comprising:
   a wireless receiver configured to wirelessly receive a low-power wireless signal, the low-power wireless signal being wirelessly transmitted in close proximity to the wireless receiver, the low-power signal comprising at least an encoded instruction code and a service code;
   a wireless transmitter configured to transmit a wireless signal via the wireless communication network to another wireless communication device in the wireless communication network;
   a controller connected to the wireless receiver and the wireless transmitter, the controller configured to obtain information encoded in a received low-power wireless signal and configured to deliver obtained information to the transmitter such that the transmitter can transmit the instruction code and the service code via the wireless communication network to at least one other wireless communication device in the wireless communication network.

13. In the wireless communication system of claim 12, wherein the controller is configured as a programmable integrated circuit.

14. In the wireless communication system of claim 13, wherein the controller comprises a look-up table configured to decode the encoded information.

15. In the wireless communication system of claim 14, wherein the low power wireless signal is at least one of a low power RF signal, a low power IR signal, or a low power ultrasound signal.

16. In the wireless communication system of claim 15, wherein the controller is further configured to take action in response to the decoded instruction code and the decoded service code.

17. In the wireless communication system of claim 16, further comprising a second wireless communication device in the plurality of wireless communication devices, the second wireless communication device in communication with the at least one wireless communication device and the second wireless communication device being configured to implement at least one of a received instruction code and service code.

* * * * *